(12) United States Patent
Oldenkotte et al.

(10) Patent No.: US 9,771,505 B2
(45) Date of Patent: Sep. 26, 2017

(54) ABRASIVE GRAIN CONTAINING A FIRST FACE WITHOUT VERTICES AND A SECOND FACE WITH VERTICES

(71) Applicant: Robert Bosch GmbH, Stuttgart (DE)

(72) Inventors: Moritz Oldenkotte, Constance (DE); Georg Hejtmann, Mundelsheim (DE); Gert Lindemann, Lichtenstein (DE); Stefan Fuenfschilling, Öhningen (DE); Petra Stedile, Esslingen (DE); Adrian Jenni, St. Gallen (CH); Tony Pleschinger, Moscow (RU)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 14/417,886

(22) PCT Filed: Jul. 31, 2013

(86) PCT No.: PCT/EP2013/066105
§ 371 (c)(1),
(2) Date: Jan. 28, 2015

(87) PCT Pub. No.: WO2014/020075
PCT Pub. Date: Feb. 6, 2014

(65) Prior Publication Data
US 2015/0259587 A1 Sep. 17, 2015

(30) Foreign Application Priority Data

Aug. 2, 2012 (DE) .................. 10 2012 213 629
Aug. 2, 2012 (DE) .................. 10 2012 213 632
(Continued)

(51) Int. Cl.
*B24D 3/00* (2006.01)
*B24D 3/02* (2006.01)
(Continued)

(52) U.S. Cl.
CPC ........ *C09K 3/1409* (2013.01); *C04B 35/1115* (2013.01); *C04B 35/6261* (2013.01);
(Continued)

(58) Field of Classification Search
USPC ........................................ 51/309, 293, 307
See application file for complete search history.

(56) References Cited

U.S. PATENT DOCUMENTS

| | | |
|---|---|---|
| 5,201,916 A | 4/1993 | Berg et al. |
| 5,672,097 A | 9/1997 | Hoopman |

(Continued)

FOREIGN PATENT DOCUMENTS

| | | |
|---|---|---|
| CN | 1081948 A | 2/1994 |
| CN | 102281992 A | 12/2011 |

(Continued)

OTHER PUBLICATIONS

International Search Report corresponding to PCT Application No. PCT/EP2013/066105, mailed Dec. 9, 2013 (German and English language document) (12 pages).

*Primary Examiner* — James McDonough
(74) *Attorney, Agent, or Firm* — Maginot, Moore & Beck LLP

(57) ABSTRACT

An abrasive grain includes a surface having at least a first face with a first outline, and at least one second face with a second outline. The first outline does not contain any vertices, but the second outline contains at least one vertex. The abrasive grain may include a ceramic material, especially polycrystalline α-$Al_2O_3$.

12 Claims, 9 Drawing Sheets

(30) Foreign Application Priority Data

Aug. 2, 2012 (EP) .................................... 12178931
Aug. 2, 2012 (EP) .................................... 12178937

(51) Int. Cl.
| | | |
|---|---|---|
| B24D 11/00 | (2006.01) | |
| B24D 18/00 | (2006.01) | |
| C09K 3/14 | (2006.01) | |
| C04B 35/111 | (2006.01) | |
| C04B 35/626 | (2006.01) | |

(52) U.S. Cl.
CPC .... *C09K 3/1418* (2013.01); *C04B 2235/3206* (2013.01); *C04B 2235/6027* (2013.01); *C04B 2235/6567* (2013.01); *C04B 2235/94* (2013.01)

(56) References Cited

U.S. PATENT DOCUMENTS

| | | |
|---|---|---|
| 5,681,217 A | 10/1997 | Hoopman et al. |
| 5,989,111 A | 11/1999 | Lamphere et al. |
| 2008/0160879 A1* | 7/2008 | Peterson ............ B24B 1/00 451/28 |
| 2009/0038234 A1* | 2/2009 | Yen ................ B24D 18/00 51/295 |
| 2010/0151196 A1 | 6/2010 | Adefris et al. |
| 2012/0167481 A1* | 7/2012 | Yener ............... C09K 3/1409 51/308 |
| 2015/0210910 A1* | 7/2015 | Hejtmann ......... C04B 35/1115 51/309 |

FOREIGN PATENT DOCUMENTS

| | | |
|---|---|---|
| CN | 102300939 A | 12/2011 |
| EP | 0 615 816 A1 | 9/1994 |
| WO | 96/12776 A1 | 5/1996 |
| WO | 2009/085841 A2 | 7/2009 |
| WO | 2010/077491 A2 | 7/2010 |
| WO | 2010/077495 A2 | 7/2010 |
| WO | 2010/077509 A1 | 7/2010 |
| WO | 2010/077518 A1 | 7/2010 |
| WO | 2010/077519 A2 | 7/2010 |
| WO | 2011/068714 A2 | 6/2011 |
| WO | 2011/068724 A2 | 6/2011 |
| WO | 2011/087649 A2 | 7/2011 |
| WO | 2011/109188 A2 | 9/2011 |
| WO | 2011/139562 A2 | 11/2011 |
| WO | 2012/018903 A2 | 2/2012 |
| WO | 2012/061016 A1 | 5/2012 |
| WO | 2012/061033 A2 | 5/2012 |

\* cited by examiner

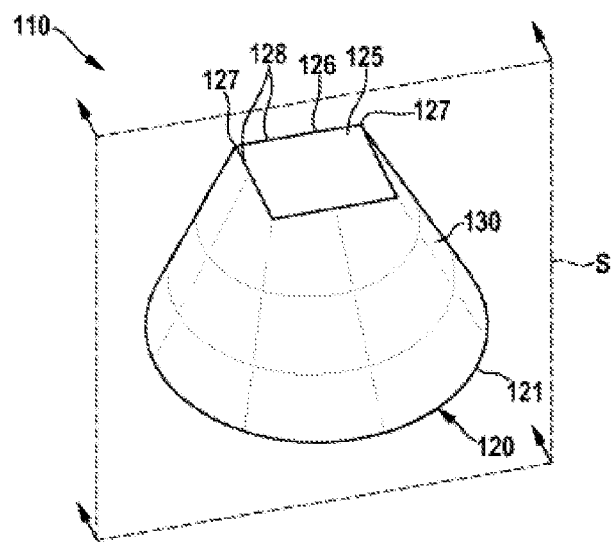
Fig. A1a
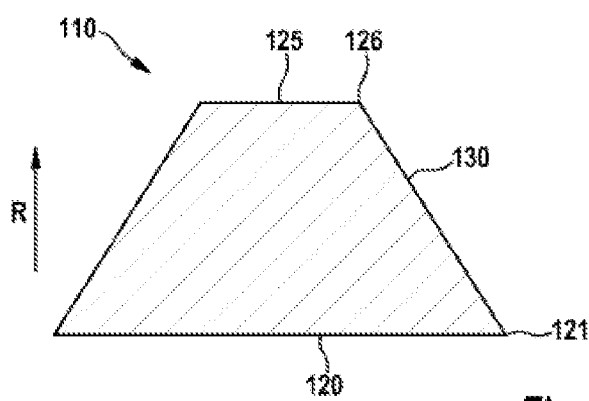
Fig. A1b

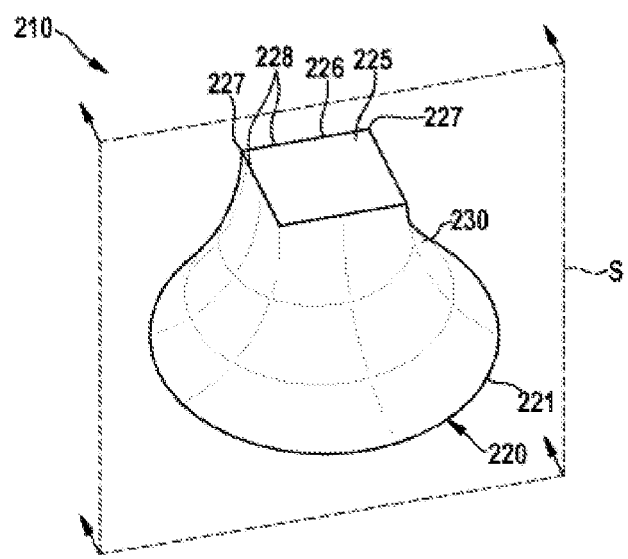
Fig. A2a
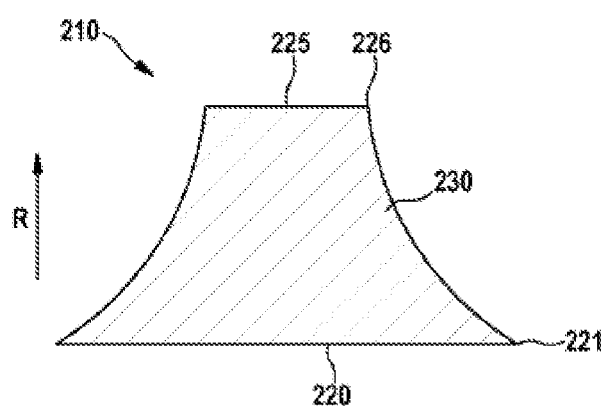
Fig. A2b

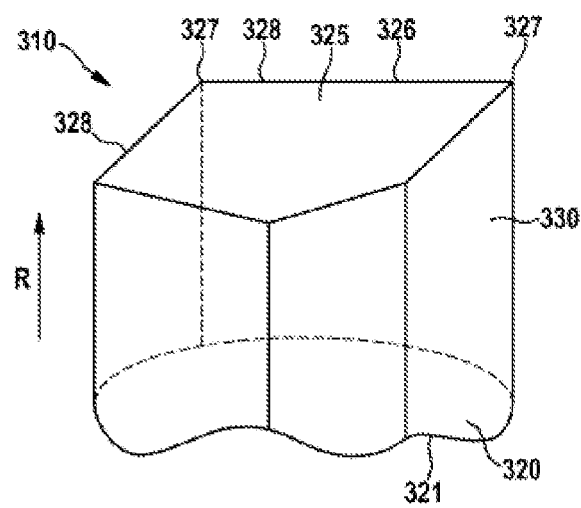
Fig. A3
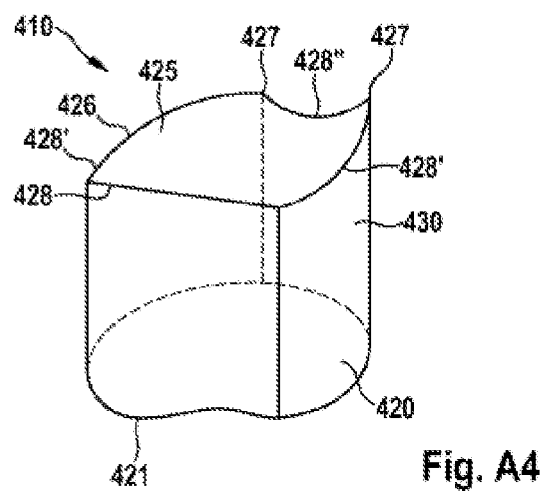
Fig. A4

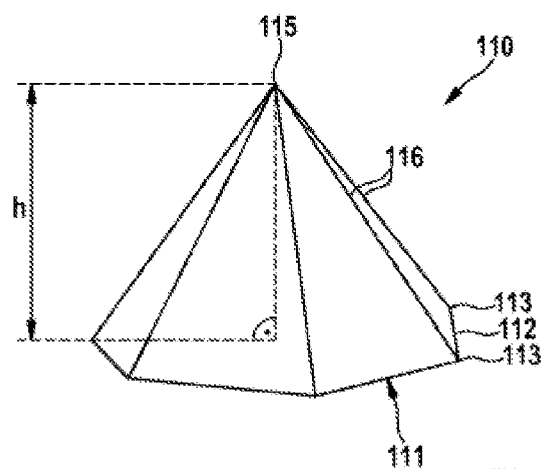
Fig. B1a
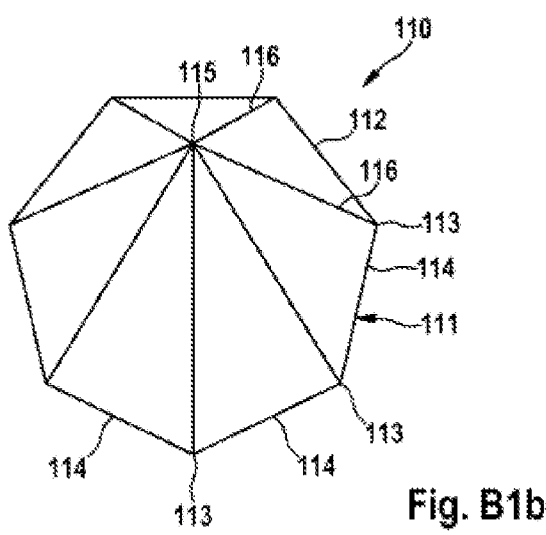
Fig. B1b

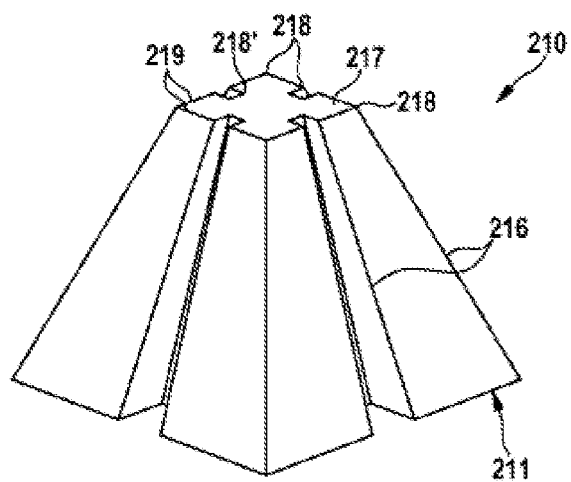
Fig. B2a
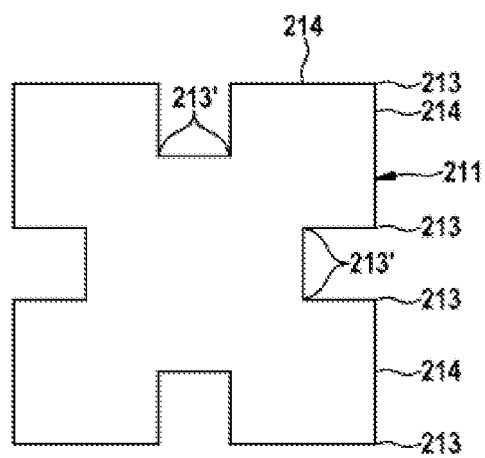
Fig. B2b

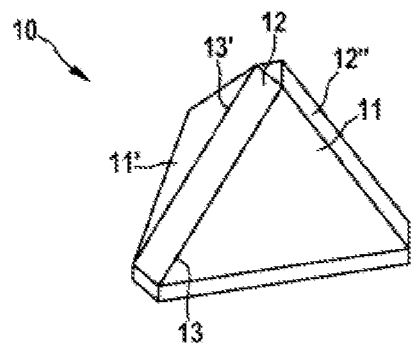
Fig. C1a
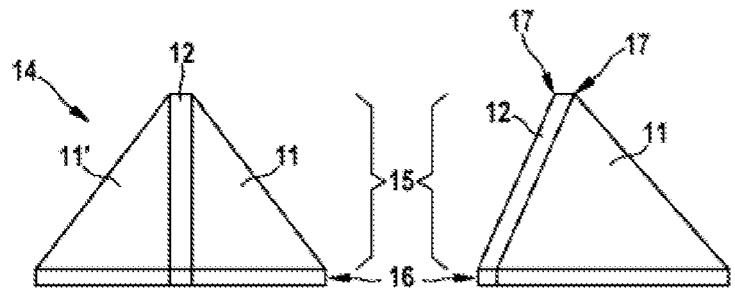
Fig. C1b
Fig. C1c
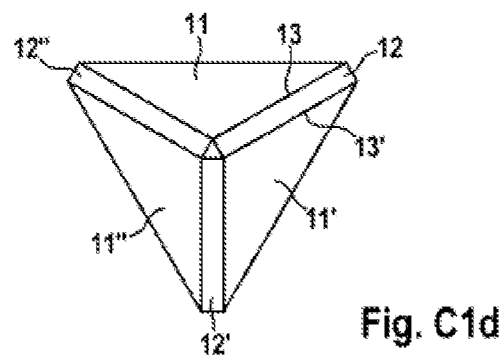
Fig. C1d

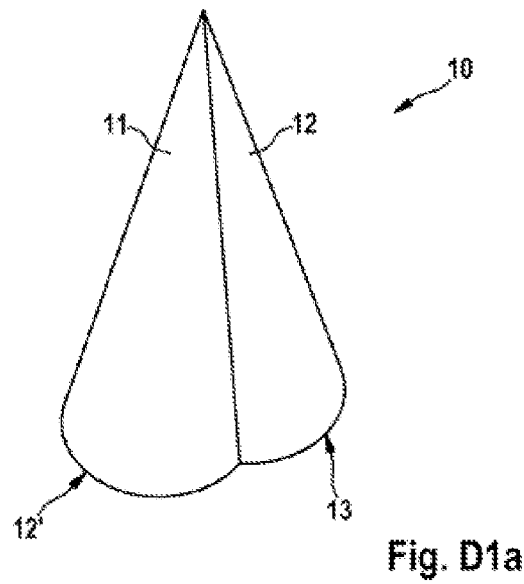
Fig. D1a
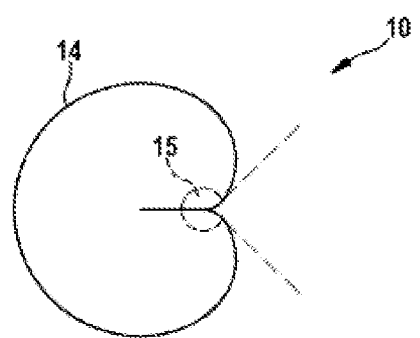
Fig. D1b

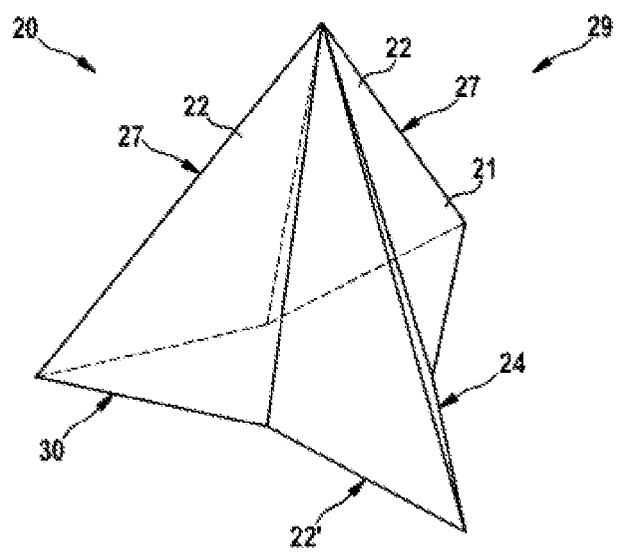
Fig. D2a
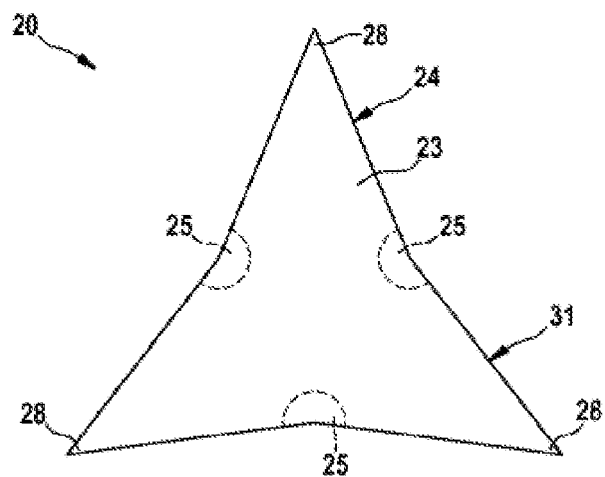
Fig. D2b

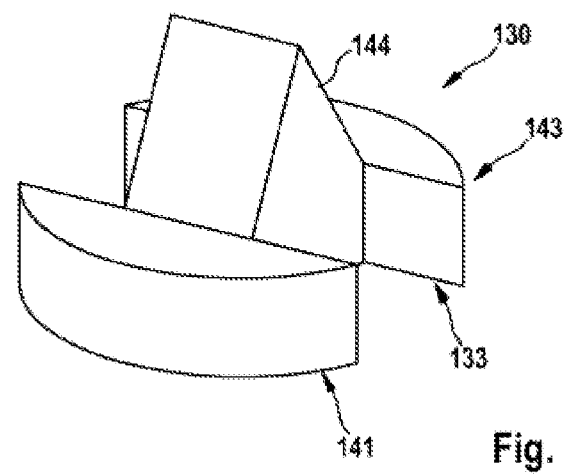
Fig. D3a
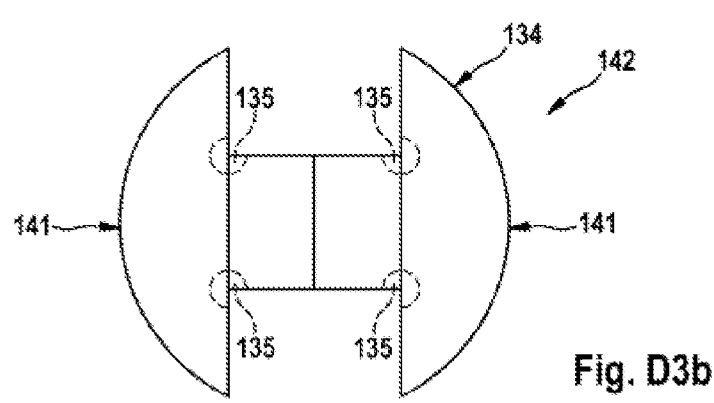
Fig. D3b
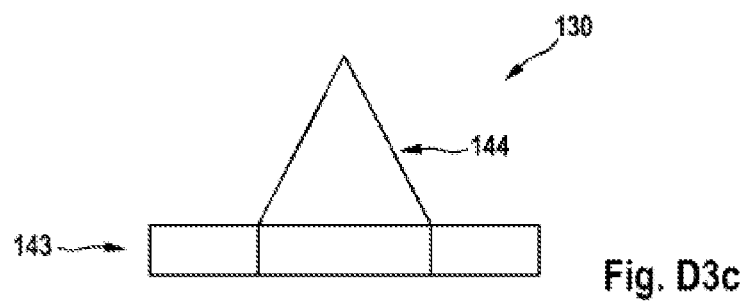
Fig. D3c

ABRASIVE GRAIN CONTAINING A FIRST FACE WITHOUT VERTICES AND A SECOND FACE WITH VERTICES

This application is a 35 U.S.C. §371 National Stage Application of PCT/EP2013/066105, filed on Jul. 31, 2013, which claims the benefit of priority to (i) patent application no. DE 10 2012 213 629.0, filed on Aug. 2, 2012 in Germany, (ii) patent application no. DE 10 2012 213 632.0, filed on Aug. 2, 2012 in Germany, (iii) patent application no. EP 12178931.7 filed on Aug. 2, 2012 in Europe, and (iv) patent application EP 12178937.4, filed on Aug. 2, 2012 in Europe. The disclosures of the above-identified patent applications are incorporated herein by reference in their entirety.

The present invention relates to abrasive grains with a defined form, collectives of abrasive grains, methods for producing abrasive grains, casting tools, abrasive articles with abrasive grains, methods for producing abrasive articles and also methods for grinding a surface with an abrasive article.

Abrasive grains, in particular ceramic abrasive grains, with a defined form and size have been known for some time.

U.S. Pat. No. 5,201,916 discloses inter alia flat abrasive grains with for example a trianglular, rectangular or circular form. These abrasive grains are produced from a dispersion which contains particles that can be converted into α-alumina and a liquid with a volatile component. The dispersion is poured into a casting mold, which has a planar base area and depressions, the forms of which are complementary to the desired forms of the abrasive grains. Subsequently, part of the volatile component is removed, and so a precursor with the desired form is produced. The precursor is then removed from the mold, calcined and finally sintered so as to produce the finished abrasive grain.

The abrasive grains produced by this method have two opposite main faces, which have substantially the same geometrical form. The abrasive grains are given a longer lifetime, since small pieces continually break off from the abrasive grains during grinding, and so new cutting surfaces are obtained. The abrasive grains thereby sharpen themselves. It is presumed that, in the case of the abrasive grains with a base area in the form of a triangle, in particular an equilateral triangle, with electrostatic scattering approximately one to two thirds become oriented in such a way that one vertex faces away from the backings, while other abrasive grains orient themselves in such a way that the vertex faces the backing.

In an alternative method, described in EP 615 816, elongate, rod-shaped precursors are first produced by means of extrusion, and then divided into individual abrasive grains. The rod-shaped abrasive grains may consequently have for example the form of a cylinder or prism.

In WO 2009/085841 there is a description of a further method of production in which the precursor is dried in the casting mold under conditions that lead to fracturing of the precursor. The shards at least partially have surfaces and edges that are complementary to the corresponding surfaces and edges of the casting mold, and therefore have the angle defined by the casting mold. These surfaces and edges provide an enhanced cutting capability. On the other hand, the further surfaces and edges produced by the fracturing are irregular.

WO 2010/077495 discloses abrasive grains which contain openings passing right through or not passing right through or have a dish-like form. Methods of production for such abrasive grains are also described there. Further abrasive grains with undefined openings are disclosed in WO 2010/077518. WO 2010/077491 is likewise concerned with abrasive grains with a dish-like form.

WO 2010/077519 discloses abrasive grains that have two opposite main faces and side faces that extend between them and are inclined in relation to the main faces.

The various side faces of an abrasive grain may be inclined at different angles in relation to the main faces.

The document WO 2011/068724 likewise shows abrasive grains that have a base side and a vertex and also inclined side faces extending in between. Similar forms of abrasive grain are also described in WO 2011/109188.

The document WO 2010/077509 is concerned with abrasive grains that have a surface with a multiplicity of grooves. These grooves are produced with the aid of complementary ridges on the underside of the casting mold.

WO 2011/068714 shows pyramidal abrasive grains with a parallelogram-shaped, in particular rhomboidal, base area, a kite-shaped base area and a superelliptical base area.

WO 2011/139562 discloses abrasive grains in the form of tetrahedrons and modifications thereof. For example, the side faces may be concavely or convexly formed, the corners of the tetrahedron may be truncated, or the edges may be curve-shaped.

The abrasive grains described in WO 2012/018903 include two or more plate-shaped portions, which are arranged at an angle in relation to one another.

In the case of the method described in WO 2012/061016, firstly an abrasive formation is produced, containing abrasive grain precursors that are connected to one another by way of frangible webs. After sintering, the abrasive grains are separated from one another by the webs being severed.

Alternatively, abrasive grains of a defined form may also be produced by a screen printing process. This is described for example by WO 96/12776. In this case, a dimensionally stable dispersion is passed through openings with a defined form onto a transporting belt and subsequently cured. The openings may for example be contained in a movable endless belt.

A further development of the screen printing process is disclosed in WO 2011/087649. In the case of this process, the dispersion is forced through the openings in the endless belt by means of a differential pressure. Given a suitable choice of the viscosity of the dispersion, with this process it is possible to produce abrasive grains of a cross section that tapers from a first main side to a second, opposite main side.

In WO 2012/061033 there is a description of methods for producing abrasive grains of a defined form with the aid of laser radiation. Moreover, further special forms of abrasive grains are disclosed. For example, the abrasive grains may include a main element and at least three rod-shaped elements extending from it. In particular, the abrasive grain may have the form of a cross, an uppercase letter "T", a star or a lowercase Greek letter "A".

It is generally assumed that abrasive grains with a defined form have improved properties from several aspects: if the abrasive grains have a defined form and size right from the beginning of their production, there is no need for a subsequent sorting step, by which the abrasive grains would otherwise have to be divided into different size fractions. Moreover, the forms and sizes also remain virtually unchanged between different production batches, which makes the abrasive properties reproducible very well. Furthermore, the abrasive grains may for example provide an increased overall removal, have a longer lifetime, produce an enhanced surface quality of the surface worked or provide a better-reproducible grinding result.

Nevertheless, the abrasive grains known from the prior art have a series of disadvantages. For example, many of the known abrasive grains cannot be arranged on the abrasive material backing in a very space-saving way. Moreover, many of the known abrasive grains cannot be anchored sufficiently in a binder applied to an abrasive material backing.

It is therefore an object of the present invention to overcome at least partially the disadvantages of the prior art. In particular, therefore, it is intended to provide an abrasive grain that is formed in such a way that a multiplicity of such abrasive grains can be arranged on an abrasive material backing in a space-saving way. Moreover, the abrasive grain should be formed in such a way that it can be anchored as securely as possible in a make coat applied to an abrasive material backing. In advantageous configurations, the abrasive grain should at the same time be of such a kind that improved chip formation and/or increased removal of material can be achieved. Moreover, in preferred embodiments, the abrasive grain should be configured in such a way that, even with the aid of mechanical scattering, it can with the greatest probability be arranged on a backing in an advantageous orientation. There is an advantageous orientation for example whenever corners and/or edges of the abrasive grain face away from the backing and therefore face a surface to be worked.

This object is achieved by an abrasive grain that has a surface with at least a first face and at least a second face. The first face has a first outer contour, which is bounded by the first face; the second face has a second outer contour, which is bounded by the second face. According to the invention, the first outer contour does not include a corner, while the second outer contour does however include at least one corner.

Here and hereinafter, a face is understood as meaning a contiguous two-dimensional part of the surface of the abrasive grain that consists of points at which a well-defined, imaginary tangential plane can be placed against the abrasive grain. Such a face may be planar or curved, in particular concavely curved or convexly curved. It may also have at least one planar portion and at least one curved portion, which go over into one another without an edge lying in between.

A corner on the second outer contour is understood here and hereinafter as meaning a point of the second outer contour at which the direction of the tangent to the second outer contour runs discontinuously. According to the invention, the first outer contour does not include a corner. This therefore means that the direction of the tangent that can be placed against the points of the first outer contour runs continuously along the entire first outer contour. The first outer contour may include at least one straight portion and/or at least one curved portion, in particular at least one convexly curved portion and/or at least one concavely curved portion. At the points at which adjacent portions touch one another, the direction of the tangent should however run continuously. For example, the first face may be circular or elliptical.

The second outer contour includes a least one corner, as defined above. The second outer contour may also include at least one straight portion and/or at least one curved portion, in particular at least one convexly curved portion and/or at least one concavely curved portion.

If such an abrasive grain according to the invention lies with the first face on an abrasive material backing, and in particular the first face is embedded in a make coat applied there, the abrasive grain is anchored particularly securely. This is so because then there are no corners of the abrasive grain there that could otherwise produce cracks in the make coat when working a surface, which could lead to a breakout of the abrasive grain. Moreover, abrasive grains with corners on the first outer contour could hinder one another if, when scattering on an abrasive material backing, they are arranged adjacently. On account of the absence of corners on the first outer contour, the abrasive grains can consequently in many cases be placed with a greater density on a backing. The corners of the second outer contour that are kept at a distance from the first outer contour, and therefore also from the backing and the make coat, and in particular face away from it, can on the other hand provide an abrasive effect.

The first face is preferably substantially planar. This allows particularly secure fixing on an abrasive material backing when the abrasive grain comes to lie with the first face on this backing.

Alternatively or in addition, the second face may be substantially planar.

Expediently, the first face and the second face lie opposite one another and are arranged in relation to one another at an angle that is less than 30°, preferably less than 20°, more preferably less than 10°, and is particularly preferably 0°. In particular if the first face and the second face are planar, it is advantageous if the abrasive grain extends completely between the two planes that are defined by the first face and the second face.

If an angle as mentioned above is formed between the first face and the second face, in particular an angle of 0°, and the abrasive grain lies with its first face on an abrasive material backing, the second face also extends at the angle mentioned in relation to this backing, in particular therefore parallel to the backing. This allows a well-defined abrasive effect to be achieved.

In geometrically simple embodiments, the second face is formed by a polygon. The corners of the polygon then form the corners of the second outer contour. Both these corners and the edges extending between them provide an improved chip-forming effect and increase the removal of material from a surface worked. The polygon may be convex or alternatively have at least one reflex corner. It may for example be a triangle, in particular an isosceles triangle or even an equilateral triangle, a quadrangle, in particular a parallelogram or even a rectangle or even a square, a pentagon, in particular a regular pentagon, or a hexagon, in particular a regular hexagon. Regular polygons are preferred, since they have a high degree of symmetry, which leads to uniform grinding properties.

In advantageous configurations, the perpendicular projection of the second face onto the first face lies completely within the convex envelope of the first face. This convex envelope is the smallest convex surface that includes the first face. The projection mentioned preferably even lies within the first face itself. As a result, the abrasive grain is particularly stable with respect to the tilting forces during grinding when it lies with the first face on an abrasive material backing.

Particularly preferably, the abrasive grain tapers along a direction running perpendicularly from the first face. This therefore means that the perpendicular projection of each first cross-sectional area extending parallel to the first face and at a first distance from it lies completely within each second cross-sectional area extending parallel to the first face and at a second, smaller distance from it. This allows particularly good anchorage in a make coat applied to a backing, since the abrasive grain has a kind of "standing foot". Moreover, this has the effect that, even with mechanical scattering, the abrasive grain with great probability comes to lie with the first face on the backing.

Between the first face and the second face, a lateral area may be formed. It is favorable if the lines of intersection of the lateral area with at least one sectional plane that extends perpendicularly to the first face and perpendicularly to the second face are at least partially concave. In many exemplary embodiments, this likewise has the effect of producing a kind of "standing foot", which allows improved anchorage in a make coat. The property mentioned advantageously applies to every sectional plane that extends perpendicularly to the first face and perpendicularly to the second face. It is likewise advantageous if the sectional lines are completely concave. Moreover, it is expedient if the sectional lines are strictly concave.

The form and the size of the abrasive grain can be determined for instance with the aid of a microscope. The abrasive grain according to the invention may have a size in the entire range of sizes that is also customary for conventional abrasive grains. Usually, abrasive grains with larger sizes lead to a greater removal of material from a worked surface than smaller abrasive grains. For example, the abrasive grain may have a size in the range from 100 μm to 2000 μm. This size can be determined experimentally with the aid of a microscope. It is understood as the diameter of an enveloping circle of the first face, that is to say as the smallest diameter of a circle which encloses the first face. If the abrasive grain has multiple first faces without a corner, the size of the abrasive grain is the greatest of the diameters of all these faces.

The form described above of the abrasive grain is an idealization. However, the invention also comprises abrasive grains that deviate from this idealized form within the limits of production tolerances. Possible deviations from the idealized form may be due to one or more of the following causes:

- cavities or small bubbles on account of trapped air and/or other gases in a dispersion from which the abrasive grains are produced;
- missing corners and/or edges that are produced due to incomplete filling of a casting mold and/or during removal of a precursor of the abrasive grain from a casting mold;
- sunken side faces and/or edges that are produced due to shrinkage during the removal of part of the volatile components of the dispersion; in particular, sunken faces that are produced from the upper free surface of the dispersion, which is not in contact with the casting mold;
- instances of flaking that are caused by a drying and/or sintering process;
- broken-off corners and/or edges that are produced by transporting and/or during further processing of the abrasive grains as bulk material.

The deviations from the idealization do not necessarily have to lead to disadvantageous properties of the abrasive grain. For example, broken-off corner and/or edges can also have the effect that further cutting edges in comparison with the idealization are produced, and may even positively influence the abrasive effect.

The invention also comprises in particular abrasive grains of which the form only coincides substantially with the idealized form. For example, the first or the second face are understood as substantially planar if they are curved and have radii of curvature that are at least twice, preferably at least five times, particularly preferably at least ten times, the size defined above of the abrasive grain. Furthermore, a point of the second outer contour is regarded as a corner if there actually is a curvature there, the curvature of which however is at most 10%, preferably at most 5%, particularly preferably at most 2%, of the size of the abrasive grain. Similarly, portions of the first or the second outer contour are regarded as straight if they are at least partially or even completely curve-shaped and have a radius of curvature that is at least twice, preferably at least five times, particularly preferably at least ten times, the size of the abrasive grain. In particular, an outer contour is also regarded as a polygon if it is made up of such substantially straight portions and corners.

However, the abrasive grain preferably has an idealized formed as described above.

The abrasive grain may for example contain or consist of a ceramic material, in particular a polycrystalline ceramic material. The abrasive grain preferably contains aluminum oxide, particularly preferably $\alpha$-$Al_2O_3$.

Alternatively or in addition, the abrasive grain may also contain at least one further metal oxide, such as for instance sodium oxide, magnesium oxide, iron oxide, silicon oxide, calcium oxide, zirconium oxide, yttrium oxide, zinc oxide, cobalt oxide, nickel oxide, hafnium oxide, chromium oxide, praseodymium oxide, samarium oxide, ytterbium oxide, neodymium oxide, lanthanum oxide, gadolinium oxide, cerium oxide, dysprosium oxide, erbium oxide, lutetium oxide, titanium oxide, manganese oxide or any desired combinations thereof.

Many of these metal oxides originate from impurities in the starting raw materials, such as for example in aluminum oxide. With sufficiently small fractions in the abrasive grain, such impurities do not however have any adverse influence on the production and application of the abrasive grain. Some of the impurities mentioned may even have a positive effect on the abrasive grain.

Fractions of zirconium oxide or yttrium oxide may for example originate from grinding balls that can be used in a grinding step in the production of the abrasive grains. Fractions of iron oxide may originate from a grinding vessel that is used in such a grinding step.

Likewise alternatively or in addition, the abrasive grain may contain further hard materials, such as for example silicon carbide.

Furthermore, the abrasive grain may contain at least one breakdown product of a dispersant described in more detail below that was used in the production of the abrasive grains. In addition, the abrasive grain may comprise at least one nucleating agent or breakdown product thereof that was used in the production of the abrasive grains. The nucleating agent may be for example the magnesium oxide already mentioned above.

Moreover, the abrasive grain may also contain at least one of the further substances described in EP 615 816 A1.

The ingredients mentioned can be determined with the aid of chemical analysis methods known per se.

The abrasive grain may contain or consist of a structure having one or more different phases. A first phase may consist of aluminum oxide, particularly preferably of $\alpha$-$Al_2O_3$. A second phase may consist of one or more of the aforementioned further metal oxides and/or further hard substances.

The proportion of aluminum oxide, in particular of $\alpha$-$Al_2O_3$, in the abrasive grain may be for example at least 25% by weight, preferably at least 50% by weight, more preferably at least 70% by weight, particularly preferably at least 95% by weight.

The abrasive grain may have a coating which covers only part of the surface, in particular only one or more edges and/or only one of a number of flat regions of the surface. The coating may for instance be a ferromagnetic or paramagnetic coating. Such a partial coating of the surface with a ferromagnetic or paramagnetic material makes it possible to align the abrasive grain in a given direction in a magnetic field applied during the scattering operation. Alternatively, it may also be a coating of a material with increased thermal conductivity or a coating that makes enhanced adhesion of the abrasive grain on the abrasive material backing possible.

A further aspect of the invention relates to a collective of abrasive grains. A collective of abrasive grains is understood here and hereinafter as meaning a coherent collection of abrasive grains. For example, this may be a collection of abrasive grains that are contained in a container and are stored and/or transported as such, for example in a sack.

Such a collection of abrasive grains can be used to produce an abrasive article. The entirety of all the abrasive grains present in an abrasive article is also regarded as a collective of abrasive grains.

Preferably, the collective of abrasive grains includes at least 20% by weight, preferably at least 50% by weight, particularly preferably at least 90% by weight, of abrasive grains according to the invention, as described above. The other abrasive grains included in the collective may likewise have a defined form, but one that differs from the form according to the invention, or they may not have a defined form since they are for example fractured abrasive grains. These other abrasive grains included in the collective are also referred to as "supporting grains".

It is conceivable and within the scope of the invention that the abrasive grains according to the invention included in the collective are formed differently from one another. For example, the collective of abrasive grains may include a first fraction of abrasive grains of a first embodiment according to the invention and also a second fraction of abrasive grains of a second embodiment according to the invention that is different from the first embodiment according to the invention. In particular, the abrasive grains of the first embodiment according to the invention may differ from the abrasive grains of the second embodiment according to the invention in their size and/or in their form.

The collective of abrasive grains may consist exclusively of identical abrasive grains according to the invention; in particular, the collective then has a size distribution in the form of points.

The collective of abrasive grains may substantially have a size distribution that conforms to a size standard customary in the abrasives industry, for example the American National Standards Institute (ANSI), the Standards of the Federation of European Producers of Abrasives (FEPA) or the Japanese Industrial Standard (JIS). For example, the collective of the abrasive grains may substantially have a grain size of P12, P16, P20, P24, P30, P36, P40, P50, P60, P80, P100, P120, P150, P180, P220, P240, P280, P320, P360, P400, P500, P600, P800, P1000, P1200, P1500, P2000, P2500, P3000 or P5000 according to the FEPA standard. In this context, "substantially" have a size distribution means that at least 90% by weight, preferably at least 95% by weight, more preferably at least 99% by weight and particularly preferably all of the abrasive grains in the collective of abrasive grains meet this standard.

As already described above, it is also conceivable that the collective includes at least two different fractions of abrasive grains according to the invention and/or at least one fraction of abrasive grains not according to the invention. Each of these fractions may itself have a size distribution that respectively conforms to one of the aforementioned size standards customary in the abrasives industry.

An abrasive grain according to the invention or a collective of abrasive grains according to the invention can for example be produced by the following method known from U.S. Pat. No. 5,201,916:

a. preparing or providing a dispersion, containing α-alumina particles and/or particles that can be converted into α-alumina, and also at least one volatile dispersion medium, preferably water;
b. introducing the dispersion into at least one depression in a casting mold;
c. optionally wiping an upper side of the casting mold in order to remove at least part of the dispersion that stands above the upper side of the casting mold;
d. removing part of the volatile components of the dispersion, so as to form at least one abrasive grain precursor;
e. removing the abrasive grain precursor from the casting mold;
f. optionally calcining the abrasive grain precursor;
g. sintering the abrasive grain precursor in order to obtain at least one abrasive grain.

Before and/or during the preparation of the dispersion in step a), the raw materials, in particular α-alumina particles and/or particles that can be converted into α-alumina, may be ground. This may be performed for example with the aid of a ball mill, in particular with the aid of a planetary ball mill.

The dispersion may contain at least one dispersant. Such a dispersant facilitates the formation of the dispersion and increases its stability, for example by forming around the individual grains layers that prevent clumping. The dispersant may be for example a polymer. Generally, the dispersant breaks down at the latest during the sintering in step g).

A casting tool may be used for producing the abrasive grains according to the invention, the casting tool comprising at least one casting mold, which has at least one depression with a respective surface, the surface being complementary to the form of at least part of the surface of the abrasive grain.

There are preferably a multiplicity of depressions in the casting mold, and so a multiplicity of abrasive grains can be cast by one casting operation.

In a further development of the method known from U.S. Pat. No. 5,201,916, the aforementioned casting mold may be only part of a multipart casting tool that additionally comprises at least one molding element, in particular a further casting mold or die element, with which, in addition to the surface molded in the first casting mold, at least part of the remaining surface of the abrasive grain can be molded. This is meaningful in particular whenever the abrasive grain to be produced has undercuts.

For example, die elements that are guided into the filled depressions in the first casting mold may be provided. Alternatively, it is also conceivable that, in the optional step c), not all of the dispersion that stands above the upper side of the casting mold is wiped off, but instead a layer of a suitable thickness is left over the upper side of the casting mold. The dispersion in step c) should be dimensionally stable enough for this. For example, a dispersion that is already dimensionally stable enough may be introduced in step b), or the dispersion may be transformed into a state that is dimensionally stable enough between steps b) and c). In the case of this variant, the die elements do not necessarily have to enter the depression; instead, shaping may be performed with the aid of the die elements in the part of the dispersion that stands above the mold.

The die elements preferably do not close off the depressions in the casting mold completely, and so the volatile component of the dispersion can escape.

More complicated forms of abrasive grains can be formed in casting molds that can be assembled, in a way similar to in the injection-molding process. For this purpose, at least one casting mold has at least one filling opening, through which the dispersion can be introduced into the depressions.

The casting mold and/or the die element may for example contain or consist of silicone. The depressions may have an open top surface, through which the dispersion can be introduced. The depressions in the casting mold have in each case a surface of a form that is complementary to the form of at least part of the surface of the desired abrasive grain. Preferably, the depressions in the casting mold have in each case a surface of a form that is complementary to the form of the part of the surface of the abrasive grain that does not form the first face of the abrasive grain or does not form the second face of the abrasive grain. The first face or the second face may then be produced from the upper free surface of the dispersion, which is not in contact with the casting mold. On account of possible shrinkage of the dispersion during step d), it is possible that the first face or the second face is not completely planar, but has a slight curvature.

The precursor produced in step d) should preferably be mechanically stable enough to be further processible as bulk material in the subsequent steps. The optional calcining in step f) is advantageous, or even required, in particular whenever the dispersion contains a number of different raw materials and a phase transformation is required.

Another aspect of the invention relates to an abrasive article that contains a collective of abrasive grains as described above. In particular, it is thus possible for at least 20% by weight, preferably at least 50% by weight, particularly preferably at least 90% by weight, of all the abrasive grains of the abrasive article to be formed as abrasive grains according to the invention, as described above. The other abrasive grains may likewise have a defined form, but one which differs from the form according to the invention, or they may not have a defined form.

The abrasive article may be for example a coated abrasive article (coated abrasive), a nonwoven abrasive article, a bonded abrasive article (bonded abrasive) or an abrasive brush.

A coated abrasive article includes a backing, in particular a flexible backing, such as for example paper, vulcanized fiber, a film, a textile material, a foam or multilayer combinations thereof. The abrasive grains can be secured to the backing with the aid of a base binder ("make coat"). The make coat and the abrasive grains may be covered with a top binder ("size coat"). Optionally, it is also possible for there to be above the size coat mentioned a second top binder ("supersize coat").

All binders known per se, for example of synthetic resin, such as for instance a phenolic resin, an epoxide, a urea resin, a melamine resin or an unsaturated polyester resin, may be used as the make coat, size coat and supersize coat. The size coat and/or supersize coat may also contain further customary active ingredients and/or fillers.

The abrasive article may take different product forms, for example that of an abrasive disk or that of an abrasive belt.

The invention also comprises a method for producing an abrasive article according to the invention, as described above. The method includes a step in which a collective of abrasive grains is fixed on and/or in a substrate, in particular by means of a binder. The substrate may be for instance a backing, in particular a flexible backing, of a coated abrasive article, a nonwoven material of a nonwoven abrasive, a matrix of a bonded abrasive or bristles of an abrasive brush. In the case of a coated abrasive article, the make coat and/or the abrasive grains and/or the size coat and/or the supersize coat can be applied by a method known per se. For example, the abrasive grains can be applied electrostatically or mechanically (i.e. gravimetrically). In particular in the case of the advantageous embodiments described above, even with mechanical scattering, a large proportion of the abrasive grains are oriented such that the first face comes to lie on a backing. This makes it possible to dispense with more complex electrostatic scattering.

Furthermore, the invention is also directed to a method for grinding a surface with an abrasive article as described above. The surface may be in particular a painted surface. In the case of a painted surface, abrasive grains with sizes of 500 µm or less are particularly suitable.

The object is also achieved by an abrasive grain with a surface that includes at least one main face with an outer contour that has at least seven corners.

Here and hereinafter, a face, and in particular a main face, is understood as meaning a contiguous two-dimensional part of the surface of the abrasive grain, which consists of points at which a well-defined imaginary tangential plane can in each case be placed on the abrasive grain. Such a face may be planar or curved, in particular concavely curved or convexly curved; it may also have at least one planar portion and at least one curved portion, these portions merging into one another without an edge lying in between.

The outer contour of the main face may include at least one straight portion and/or at least one curved portion, in particular at least one convexly curved portion and/or at least one concavely curved portion.

According to the invention, the main face has an outer contour with at least seven corners. In very many exemplary embodiments, the abrasive grain then also has a multiplicity of edges, whereby a high abrasive effect can be achieved. For example, the outer contour of the main face includes at least seven edges, which connect the at least seven corners to one another. In addition, the abrasive grain may include for each of the corners of the outer contour of the main face at least one further edge, which connects this corner to a point outside the main face.

The number of corners of the main face is at least seven, or may be at least eight, at least nine, at least ten, at least eleven, at least twelve, at least 13, at least 14, at least 15, at least 16, at least 17, at least 18, at least 19 or at least 20. It may be precisely seven, precisely eight, precisely nine, precisely ten, precisely eleven, precisely twelve, precisely 13, precisely 14, precisely 15, precisely 16, precisely 17, precisely 18, precisely 19 or precisely 20.

With particular advantage, the main face is substantially planar. This is so because then the abrasive grain can be fixed particularly securely to a planar abrasive material backing when it comes to lie with the main face on this backing.

In some geometrically simple configurations, the abrasive grain may be formed as a cone with a base area of which the outer contour has at least seven corners or a greater number of corners as specified above. A cone is understood here generally as meaning a geometrical body that is bounded by a substantially planar base area and a multiplicity of substantially straight generating lines, each point of the outer contour of the base area being connected to a common point of the cone (the vertex of the cone) by one of the generating lines in each case, the vertex of the cone lying outside the plane defined by the base area. In particular, the cone may be a pyramid in which the base area is formed by a polygon with at least seven corners. From each corner of the base area of such a pyramid, an edge of the abrasive grain extends to the vertex of the pyramid and can provide a cutting effect. As an alternative to this, however, it is also conceivable that the base area of the cone has at least one curved portion or even exclusively curved portions, as long as the number of corners that are arranged between these curved portions is at least seven.

In other geometrically simple configurations, the abrasive grain may be formed as a frustocone with a base area of which the outer contour has at least seven corners or a greater number of corners as specified above. By analogy with the general definition above, a frustocone is defined as part of a cone in which the vertex of the cone has been removed by a substantially planar section. The top area produced by this section likewise has at least seven corners. In particular, the frustocone may be a frustopyramid with a base area that is formed by a polygon with at least seven corners. From each corner of the base area of such a frustopyramid, an edge of the abrasive grain extends to a corresponding corner of the top area and can provide a cutting effect. Moreover, the top area of the frustopyramid includes the same number of edges as the base area, which leads to a further increase in the cutting effect.

In further geometrically simple configurations, the abrasive grain may be formed as a cylinder with a base area of which the outer contour has at least seven corners or a greater number of corners as specified above. A cylinder is understood here and hereinafter as meaning generally a body that is bounded by a base area and a top area and also by a lateral area. The base area and the top area are in this case preferably substantially planar and likewise preferably substantially parallel to one another. The lateral area is formed by an array of substantially mutually parallel lines. If these lines run substantially perpendicularly to the base area and the top area, the result is a straight cylinder. However, skewed cylinders are likewise conceivable and are within the scope of the invention. The base area of the cylinder may be for example a polygon with at least seven corners; in this case, the abrasive grain is therefore formed as a prism.

It is likewise conceivable that the abrasive grain is formed as an antiprism with a base area of which the outer contour has at least seven corners or a greater number of corners as specified above. An antiprism is bounded by precisely two congruent n-edged polygons and 2n triangles, in particular equilateral triangles. At a corner, there is always a junction of one n-edged polygon and three triangles. The total number of edges of the antiprism is 4n, that is n edges on the base area, n edges on the opposite top area and 2n edges that run between the base area and the top area. For these embodiments, according to the invention n is at least 7, and so the total number of edges is at least 28.

The abrasive grain may also have the form of a twisted cone, in particular a twisted pyramid, a twisted frustocone, in particular a twisted frustopyramid, a twisted cylinder or a twisted antiprism. This means that the sectional areas of the twisted body parallel to the base area are turned by an angle with respect to the non-twisted body, this angle depending on the distance of the sectional area from the base area. For instance, this angle may depend linearly on the distance of the sectional area from the base area. For example, a twisted cylinder with a base area in the form of a regular heptagon may have approximately the form of a bolt with a seven-start thread.

If the main face of the abrasive grain is substantially planar, the abrasive grain may be assigned a height that is then understood as the greatest perpendicular distance of a point of the abrasive grain from the main face. The main face may also be assigned an area diameter. This is the smallest diameter of a circle that includes the main face; it can consequently be understood as the diameter of an enveloping circle of the main face. The ratio between the height and the area diameter preferably lies in the range from 0.8 to 1.4, more preferably from 0.9 to 1.2, particularly preferably from 0.95 to 1.05. It is advantageous for mechanical scattering if the ratio mentioned lies in the lower subrange of this range, since, with mechanical scattering, the abrasive grain is then preferably oriented with its main face on an abrasive material backing. In terms of advantageous chip-forming behavior, greater ratios within the range mentioned tend to be expedient, since the angle between the abrasive grain and a worked surface lies closer to 90°.

In many geometrically simple embodiments, the base area is a polygon with at least seven corners or a greater number of corners as specified above. This is the case for example in the exemplary embodiments described above of a pyramid and a frustopyramid. The invention, however, comprises still further geometries with a polygonal base area that are neither pyramids nor frustopyramids nor cylinders. The polygon may be convex; this means that the internal angle at each corner is less than 180°. However, it is also conceivable and within the scope of the invention that the polygon has at at least one corner an internal angle that is greater than 180°, and so the polygon is not convex. For example, the polygon may have the form of a star. In some embodiments, the polygon is regular; this means that all of the edges of the polygon are equal in length and also the internal angles at all the corners are equal in size.

The form and the size of the abrasive grain can be determined for instance with the aid of a microscope. The abrasive grain according to the invention may have a size in the entire range of sizes that is also customary for conventional abrasive grains. Usually, abrasive grains with larger sizes lead to a greater removal of material from a worked surface than smaller abrasive grains. For example, the abrasive grain may have a size in the range from 100 μm to 2000 μm. This size can be determined experimentally with the aid of a microscope. It is understood as the area diameter described above of the main face of which the outer contour has at least seven corners. If the abrasive grain includes more than one main face of which the outer contour has at least seven corners, the size of the abrasive grain is understood as the greatest area diameter of all these main faces.

The form described above of the abrasive grain is an idealization. However, the invention also comprises abrasive grains that deviate from this idealized form within the limits of production tolerances. Possible deviations from the idealized form may be due to one or more of the following causes:

cavities or small bubbles on account of trapped air and/or other gases in a dispersion from which the abrasive grains are produced;

missing corners and/or edges that are produced due to incomplete filling of a casting mold and/or during removal of a precursor of the abrasive grain from a casting mold;

sunken side faces and/or edges that are produced due to shrinkage during the removal of part of the volatile components of the dispersion; in particular, sunken faces that are produced from the upper free surface of the dispersion, which is not in contact with the casting mold;

instances of flaking that are caused by a drying and/or sintering process;

broken-off corners and/or edges that are produced by transporting and/or during further processing of the abrasive grains as bulk material.

The deviations from the idealization do not necessarily have to lead to disadvantageous properties of the abrasive grain. For example, broken-off corner and/or edges can also have the effect that further cutting edges in comparison with the idealization are produced, and may even positively influence the abrasive effect.

The invention also comprises in particular abrasive grains of which the form only coincides substantially with the idealized form. For example, part of the surface of the abrasive grain is also regarded as a (single) face if this part actually includes two or more contiguous parts of an area which touch one another at an edge at which there is included an internal angle that lies in the range from 160° to 200°, preferably from 170° to 190°, particularly preferably from 175° to 185°. Furthermore, a point of the surface is regarded as a corner if there actually is a curvature there, the radii of curvature of which however are at most 10%, preferably at most 5%, particularly preferably at most 2%, of the size defined above of the abrasive grain. Furthermore, the main face is also understood as substantially planar if it is curved and has radii of curvature that are at least twice, preferably at least five times, particularly preferably at least ten times, the size defined above of the abrasive grain. Moreover, the form of the abrasive grain is also regarded as a cylinder, cone or frustocone if the generating lines are at least partially or even completely curved and have a radius of curvature that is at least twice, preferably at least five times, particularly preferably at least ten times, the size of the abrasive grain.

However, the abrasive grain preferably has an idealized formed as described above.

The abrasive grain may for example contain or consist of a ceramic material, in particular a polycrystalline ceramic material. The abrasive grain preferably contains aluminum oxide, particularly preferably $\alpha$-$Al_2O_3$.

Alternatively or in addition, the abrasive grain may also contain at least one further metal oxide, such as for instance sodium oxide, magnesium oxide, iron oxide, silicon oxide, calcium oxide, zirconium oxide, yttrium oxide, zinc oxide, cobalt oxide, nickel oxide, hafnium oxide, chromium oxide, praseodymium oxide, samarium oxide, ytterbium oxide, neodymium oxide, lanthanum oxide, gadolinium oxide, cerium oxide, dysprosium oxide, erbium oxide, lutetium oxide, titanium oxide, manganese oxide or any desired combinations thereof.

Many of these metal oxides originate from impurities in the starting raw materials, such as for example in aluminum oxide. With sufficiently small fractions in the abrasive grain, such impurities do not however have any adverse influence on the production and application of the abrasive grain. Some of the impurities mentioned may even have a positive effect on the abrasive grain.

Fractions of zirconium oxide or yttrium oxide may for example originate from grinding balls that can be used in a grinding step in the production of the abrasive grains. Fractions of iron oxide may originate from a grinding vessel that is used in such a grinding step.

Likewise alternatively or in addition, the abrasive grain may contain further hard materials, such as for example silicon carbide.

Furthermore, the abrasive grain may contain at least one breakdown product of a dispersant described in more detail below that was used in the production of the abrasive grains. In addition, the abrasive grain may comprise at least one nucleating agent or breakdown product thereof that was used in the production of the abrasive grains. The nucleating agent may be for example the magnesium oxide already mentioned above.

Moreover, the abrasive grain may also contain at least one of the further substances described in EP 615 816 A1.

The ingredients mentioned can be determined with the aid of chemical analysis methods known per se.

The abrasive grain may contain or consist of a structure having one or more different phases. A first phase may consist of aluminum oxide, particularly preferably of $\alpha$-$Al_2O_3$. A second phase may consist of one or more of the aforementioned further metal oxides and/or further hard substances.

The proportion of aluminum oxide, in particular of $\alpha$-$Al_2O_3$, in the abrasive grain may be for example at least 25% by weight, preferably at least 50% by weight, more preferably at least 70% by weight, particularly preferably at least 95% by weight.

The abrasive grain may have a coating which covers only part of the surface, in particular only one or more edges and/or only one of a number of flat regions of the surface. The coating may for instance be a ferromagnetic or paramagnetic coating. Such a partial coating of the surface with a ferromagnetic or paramagnetic material makes it possible to align the abrasive grain in a given direction in a magnetic field applied during the scattering operation. Alternatively, it may also be a coating of a material with increased thermal conductivity or a coating that makes enhanced adhesion of the abrasive grain on the abrasive material backing possible.

A further aspect of the invention relates to a collective of abrasive grains. A collective of abrasive grains is understood here and hereinafter as meaning a coherent collection of abrasive grains. For example, this may be a collection of abrasive grains that are contained in a container and are stored and/or transported as such, for example in a sack.

Such a collection of abrasive grains can be used to produce an abrasive article. The entirety of all the abrasive grains present in an abrasive article is also regarded as a collective of abrasive grains.

Preferably, the collective of abrasive grains includes at least 20% by weight, preferably at least 50% by weight, particularly preferably at least 90% by weight, of abrasive grains according to the invention, as described above. The other abrasive grains included in the collective may likewise have a defined form, but one that differs from the form according to the invention, or they may not have a defined form since they are for example fractured abrasive grains. These other abrasive grains included in the collective are also referred to as "supporting grains".

It is conceivable and within the scope of the invention that the abrasive grains according to the invention included in the collective are formed differently from one another. For example, the collective of abrasive grains may include a first fraction of abrasive grains of a first embodiment according to the invention and also a second fraction of abrasive grains of a second embodiment according to the invention that is different from the first embodiment according to the invention. In particular, the abrasive grains of the first embodiment according to the invention may differ from the abrasive grains of the second embodiment according to the invention in their size and/or in their form.

The collective of abrasive grains may consist exclusively of identical abrasive grains according to the invention; in particular, the collective then has a size distribution in the form of points.

The collective of abrasive grains may substantially have a size distribution that conforms to a size standard customary in the abrasives industry, for example the American National Standards Institute (ANSI), the Standards of the Federation of European Producers of Abrasives (FEPA) or the Japanese Industrial Standard (JIS). For example, the collective of the abrasive grains may substantially have a grain size of P12, P16, P20, P24, P30, P36, P40, P50, P60, P80, P100, P120, P150, P180, P220, P240, P280, P320, P360, P400, P500, P600, P800, P1000, P1200, P1500, P2000, P2500, P3000 or P5000 according to the FEPA standard. In this context, "substantially" have a size distribution means that at least 90% by weight, preferably at least 95% by weight, more preferably at least 99% by weight and particularly preferably all of the abrasive grains in the collective of abrasive grains meet this standard.

As already described above, it is also conceivable that the collective includes at least two different fractions of abrasive grains according to the invention and/or at least one fraction of abrasive grains not according to the invention. Each of these fractions may itself have a size distribution that respectively conforms to one of the aforementioned size standards customary in the abrasives industry.

An abrasive grain according to the invention or a collective of abrasive grains according to the invention can for example be produced by the following method known from U.S. Pat. No. 5,201,916:

a. preparing or providing a dispersion, containing α-alumina particles and/or particles that can be converted into α-alumina, and also at least one volatile dispersion medium, preferably water;
b. introducing the dispersion into at least one depression in a casting mold;
c. optionally wiping an upper side of the casting mold in order to remove at least part of the dispersion that stands above the upper side of the casting mold;
d. removing part of the volatile components of the dispersion, so as to form at least one abrasive grain precursor;
e. removing the abrasive grain precursor from the casting mold;
f. optionally calcining the abrasive grain precursor;
g. sintering the abrasive grain precursor in order to obtain at least one abrasive grain.

Before and/or during the preparation of the dispersion in step a), the raw materials, in particular α-alumina particles and/or particles that can be converted into α-alumina, may be ground. This may be performed for example with the aid of a ball mill, in particular with the aid of a planetary ball mill.

The dispersion may contain at least one dispersant. Such a dispersant facilitates the formation of the dispersion and increases its stability, for example by forming around the individual grains layers that prevent clumping. The dispersant may be for example a polymer. Generally, the dispersant breaks down at the latest during the sintering in step g).

A casting tool may be used for producing the abrasive grains according to the invention, the casting tool comprising at least one casting mold, which has at least one depression with a respective surface, the surface being complementary to the form of at least part of the surface of the abrasive grain.

The casting mold may for example contain or consist of silicone. The depressions may have an open top surface, through which the dispersion can be introduced. The depressions in the casting mold have in each case a surface of a form that is complementary to the form of at least part of the surface of the desired abrasive grain. Preferably, the depressions in the casting mold have in each case a surface of a form that is complementary to the form of the part of the surface of the abrasive grain that does not form the main face of the abrasive grain.

The precursor produced in step d) should preferably be mechanically stable enough to be further processible as bulk material in the subsequent steps. The optional calcining in step f) is advantageous, or even required, in particular whenever the dispersion contains a number of different raw materials and a phase transformation is required.

In a further development of the method known from U.S. Pat. No. 5,201,916, for some abrasive grains the aforementioned casting mold may advantageously be only part of a multipart casting tool that additionally comprises at least one molding element, in particular a further casting mold or die element, with which, in addition to the surface molded in the first casting mold, at least part of the remaining surface of the abrasive grain can be molded.

The die elements preferably do not close off the depressions in the casting mold completely, and so the volatile component of the dispersion can escape.

More complicated forms of bodies of abrasive grains can be formed in casting molds that can be assembled, in a way similar to in the injection-molding process. For this purpose, at least one casting mold has at least one filling opening, through which the dispersion can be introduced into the depressions.

Another aspect of the invention relates to an abrasive article that contains a collective of abrasive grains as described above. In particular, it is thus possible for at least 20% by weight, preferably at least 50% by weight, particularly preferably at least 90% by weight, of all the abrasive grains of the abrasive article to be formed as abrasive grains according to the invention, as described above. The other abrasive grains may likewise have a defined form, but one which differs from the form according to the invention, or they may not have a defined form.

The abrasive article may be for example a coated abrasive article (coated abrasive), a nonwoven abrasive article, a bonded abrasive article (bonded abrasive) or an abrasive brush.

A coated abrasive article includes a backing, in particular a flexible backing, such as for example paper, vulcanized fiber, a film, a textile material, a foam or multilayer combinations thereof. The abrasive grains can be secured to the backing with the aid of a base binder ("make coat"). The make coat and the abrasive grains may be covered with a top binder ("size coat"). Optionally, it is also possible for there to be above the size coat mentioned a second top binder ("supersize coat").

All binders known per se, for example of synthetic resin, such as for instance a phenolic resin, an epoxide, a urea resin, a melamine resin or an unsaturated polyester resin, may be used as the make coat, size coat and supersize coat. The size coat and/or supersize coat may also contain further customary active ingredients and/or fillers.

The abrasive article may take different product forms, for example that of an abrasive disk or that of an abrasive belt.

The invention also comprises a method for producing an abrasive article according to the invention, as described above. The method includes a step in which a collective of abrasive grains is fixed on and/or in a substrate, in particular by means of a binder. The substrate may be for instance a backing, in particular a flexible backing, of a coated abrasive article, a nonwoven material of a nonwoven abrasive, a matrix of a bonded abrasive or bristles of an abrasive brush. In the case of a coated abrasive article, the make coat and/or the abrasive grains and/or the size coat and/or the supersize coat can be applied by a method known per se. For example, the abrasive grains can be applied electrostatically or mechanically (i.e. gravimetrically). For many embodiments according to the invention, even with mechanical scattering, a large proportion of the abrasive grains are oriented on an abrasive material backing such that the main face comes to lie on the backing. This applies in particular to abrasive grains in the form of a cone or a frustocone, to be precise in particular whenever the aforementioned preferred ratios between the height and the area diameter of the abrasive grain are applicable. This makes it possible to dispense with more complex electrostatic scattering.

Furthermore, the invention is also directed to a method for grinding a surface with an abrasive article as described above. The surface may be in particular a painted surface. In the case of a painted surface, abrasive grains with sizes of 500 μm or less are particularly suitable.

The object is also achieved by an abrasive grain with at least two main surfaces and at least one subsidiary surface, which is connected by way of a first edge to a first main surface and is connected by way of a second edge to a second main surface, which does not have any edge in common with the first main surface. In this case, according to the invention the subsidiary surface includes an obtuse angle with the first main surface in the region of the first edge and an obtuse angle with the second main surface in the region of the second edge.

In particular if the subsidiary surface is planar, the two main surfaces are consequently not parallel to one another.

A main surface is understood as meaning a part of the area of the surface of an abrasive grain that forms at least 5%, in particular at least 10%, preferably at least 15% of the total surface of the abrasive grain. In particular, the main surfaces together have a proportion of at least 60%, preferably 70% of the total surface of the abrasive grain.

The main surfaces are preferably similar, more preferably congruent, to one another.

By analogy, a subsidiary surface is understood as meaning a part of the area that is significantly smaller than the main surfaces and forms at most 10%, preferably at most 5%, of the total surface of the abrasive grain.

In a preferred embodiment, the ratio of the area of subsidiary surface to the area of the main surface is from 1 to 10, particularly preferably from 2 to 15, most particularly preferably from 5 to 10.

Main and subsidiary surfaces are preferably substantially planar and are generally bounded by more than one edge.

The subsidiary surface preferably includes an obtuse angle with the first main surface and an obtuse angle with the second main surface in each case along at least 80% of an edge, in particular along an entire edge.

The edges of the abrasive grain are preferably substantially straight.

The edges of the abrasive grain are preferably substantially of the same length. Alternatively, the abrasive grain may have a compact or compressed form, by the edges having different lengths. In particular, in a preferred embodiment, three first edges are substantially of the same length and three second edges are likewise of the same length, but shorter than the three first edges. In this case, the three first edges have a first length L1 and the three second edges have a second length L2. The ratio of the second length L2 and the first length L1 is preferably from 0.7 to 0.98, particularly preferably from 0.8 to 0.95, most particularly preferably from 0.85 to 0.90. This provides an advantageous bimodal distribution of the abrasive grains on the abrasive article. Depending on how such an abrasive grain comes to lie on the backing of the abrasive article, two different heights of the abrasive grain on the backing are obtained.

An abrasive grain with such a form has a basic structure that is given by the main surfaces and can be very simple. Nevertheless, the presence of the subsidiary surfaces means that the body of the abrasive grain has further edges, which increase the cutting force.

The object is also achieved by an abrasive grain with an abrasive grain body of which the surface has at least two substantially planar main surfaces that lie on the faces of an imaginary convex polyhedron, in particular a Platonic solid, an Archimedean solid, a Catalan solid, a prism or antiprism, on the faces of a linearly distorted Platonic solid, Archimedean solid, Catalan solid, prism or antiprism or on the faces of an imaginary combination of the solids mentioned, the abrasive grain body having at least one flatly truncated edge. The main surfaces are in this case understood according to the above definition.

Platonic solids are those convex polyhedrons of which the side faces are all mutually congruent regular polygons, and of which an equal number meet at every corner. The Platonic solids include the tetrahedron, octahedron and icosahedron, each of which have equilateral triangles as side faces, the hexagon or cube, which have squares as side faces, and the dodecahedron with equilateral pentagons as side faces.

The Archimedean solids are complex polyhedrons of which the side faces are regular polygons. The characteristic property of the Archimedean solids is that all the corners of the solid are entirely identical to one another.

Prisms, antiprisms and the five Platonic solids are not counted among the Archimedean solids.

The Archimedean solids include in particular the Platonic solids with capped corners (frustotetrahedron, frustohexahedron, frustooctahedron, frustododecahedron and frustoicosahedron).

A prism is bounded by precisely two congruent n-edged polygons and n parallelograms. The n-edged polygons may in particular be regular n-edged polygons. In the case of a straight prism, the parallelograms mentioned are rectangles, in particular squares. Such a prism exists for every natural number n greater than or equal to three. At a corner, one n-edged polygon and two parallelograms always meet.

An antiprism is bounded by precisely two congruent n-edged polygons and 2n triangles, in particular equilateral triangles. Such an antiprism exists for every natural number n greater than or equal to three. At a corner, one n-edged polygon and three triangles always meet.

The Catalan solids have only one kind of face, that is identical irregular polygons, but have at least two different kinds of corners.

In a linearly distorted Platonic solid, Archimedean solid, Catalan solid, prism or antiprism, i.e. one that is compressed or extended along at least one axis, in particular an axis of symmetry, not all symmetries are maintained compared to the undistorted form. Since, however, the forms mentioned have a multitude of symmetries, the linearly distorted corresponding solid still has a number of symmetries. A cuboid for example is a linearly distorted cube that has fewer symmetries than a cube but still has many regularities.

In the case of an edge that is flatly truncated according to the invention, instead of an edge of the convex polyhedron the faces adjoining this edge are bounded by a subsidiary surface. The surface of the abrasive grain therefore has at least one subsidiary surface that lies on the area of the truncated edge.

A flatly truncated edge is obtained by cutting off from an imaginary basic body a piece, including an entire edge, parallel to the edge. The cutting surface area is preferably planar, whereby a planar subsidiary surface is produced.

The form of the abrasive grain is therefore obtained by a comparatively simple basic form that has further edges as a result of the truncation of at least one edge.

Also the subject of the present invention are such abrasive grain bodies that are made up of component bodies, one of the component bodies being a convex polyhedron with at least one truncated edge. The other component body may for example form a kind of base that consists of the same or a different material. The abrasive grain body is preferably formed as one piece. In particular, with mechanical scattering, the abrasive grain body preferably falls on the base, and the edges of the convex polyhedron face away from the backing, for example on account of gravitational force or some other external force.

In a preferred embodiment, an abrasive grain has a body as described above, and some of the faces, preferably at least three faces, of the abrasive grain, in particular main surfaces, lie on the faces of an imaginary pyramid or an imaginary frustopyramid, in particular on the faces of a tetrahedron.

Preferably, all of the edges of the tetrahedron are truncated, and so the abrasive grain body has on the one hand a compact and stable form and at the same time a multiplicity of cutting edges. Moreover, the abrasive grain body is symmetrically formed, and so it does not matter on which main surface it comes to lie during the scattering.

Each main surface is advantageously connected to at least one other main surface by way of a subsidiary surface.

Since each surface is bounded by edges, consequently a multiplicity of edges are obtained, which increases the cutting force of the abrasive grain.

The form and the size of the abrasive grain can be determined for instance with the aid of a microscope. The abrasive grain according to the invention may have a size in the entire range of sizes that is also customary for conventional abrasive grains. Usually, abrasive grains with larger sizes lead to a greater removal of material from a worked surface than smaller abrasive grains. For example, the abrasive grain may have a size in the range from 100 μm to 2000 μm. This size can be determined experimentally with the aid of a microscope. It is understood as the diameter of an enveloping circle of the microscoped image of the abrasive grain, that is to say the smallest diameter of a circle that encloses the image.

The form described above of the abrasive grain is an idealization. However, the invention also comprises abrasive grains that deviate from this idealized form within the limits of production tolerances. Possible deviations from the idealized form may be due to one or more of the following causes:

cavities or small bubbles on account of trapped air and/or other gases in a dispersion from which the abrasive grains are produced;

missing corners and/or edges that are produced due to incomplete filling of a casting mold and/or during removal of a precursor of the abrasive grain from a casting mold;

sunken side faces and/or edges that are produced due to shrinkage during the removal of part of the volatile components of the dispersion; in particular, sunken faces that are produced from the upper free surface of the dispersion, which is not in contact with the casting mold;

instances of flaking that are caused by a drying and/or sintering process;

broken-off corners and/or edges that are produced by transporting and/or during further processing of the abrasive grains as bulk material.

The deviations from the idealization do not necessarily have to lead to disadvantageous properties of the abrasive grain. For example, broken-off corner and/or edges can also have the effect that further cutting edges in comparison with the idealization are produced, and may even positively influence the abrasive effect.

The invention also comprises in particular abrasive grains of which the form only coincides substantially with the idealized form. For example, portions of the outer contour, in particular edges, are also regarded as substantially straight if they are at least partially or even completely curve-shaped and have a radius of curvature that is at least twice, preferably at least five times, particularly preferably at least ten times, the size defined above of the abrasive grain. A point of the outer contour is regarded substantially as a corner if the radius of curvature there is at most 10%, preferably at most 5%, particularly preferably at most 2%, of the size of the abrasive grain. Furthermore, main surfaces and subsidiary surfaces are understood as substantially planar if they are curved and have radii of curvature that are at least twice, preferably at least five times, particularly preferably at least ten times, the size of the abrasive grain.

However, the abrasive grain preferably has an idealized formed as described above.

The abrasive grain may for example contain or consist of a ceramic material, in particular a polycrystalline ceramic material. The abrasive grain preferably contains aluminum oxide, particularly preferably α-$Al_2O_3$.

Alternatively or in addition, the abrasive grain may also contain at least one further metal oxide, such as for instance sodium oxide, magnesium oxide, iron oxide, silicon oxide, calcium oxide, zirconium oxide, yttrium oxide, zinc oxide, cobalt oxide, nickel oxide, hafnium oxide, chromium oxide, praseodymium oxide, samarium oxide, ytterbium oxide, neodymium oxide, lanthanum oxide, gadolinium oxide, cerium oxide, dysprosium oxide, erbium oxide, lutetium oxide, titanium oxide, manganese oxide or any desired combinations thereof.

Many of these metal oxides originate from impurities in the starting raw materials, such as for example in aluminum oxide. With sufficiently small fractions in the abrasive grain, such impurities do not however have any adverse influence on the production and application of the abrasive grain. Some of the impurities mentioned may even have a positive effect on the abrasive grain.

Fractions of zirconium oxide or yttrium oxide may for example originate from grinding balls that can be used in a grinding step in the production of the abrasive grains. Fractions of iron oxide may originate from a grinding vessel that is used in such a grinding step.

Likewise alternatively or in addition, the abrasive grain may contain further hard materials, such as for example silicon carbide.

Furthermore, the abrasive grain may contain at least one breakdown product of a dispersant described in more detail below that was used in the production of the abrasive grains.

In addition, the abrasive grain may comprise at least one nucleating agent or breakdown product thereof that was used in the production of the abrasive grains. The nucleating agent may be for example the magnesium oxide already mentioned above.

Moreover, the abrasive grain may also contain at least one of the further substances described in EP 615 816 A1.

The ingredients mentioned can be determined with the aid of chemical analysis methods known per se.

The abrasive grain may contain or consist of a structure having one or more different phases. A first phase may consist of aluminum oxide, particularly preferably of $\alpha$-$Al_2O_3$. A second phase may consist of one or more of the aforementioned further metal oxides and/or further hard substances.

The proportion of aluminum oxide, in particular of $\alpha$-$Al_2O_3$, in the abrasive grain may be for example at least 25% by weight, preferably at least 50% by weight, more preferably at least 70% by weight, particularly preferably at least 95% by weight.

The abrasive grain may have a coating which covers only part of the surface, in particular only one or more edges and/or only one of a number of flat regions of the surface. The coating may for instance be a ferromagnetic or paramagnetic coating. Such a partial coating of the surface with a ferromagnetic or paramagnetic material makes it possible to align the abrasive grain in a given direction in a magnetic field applied during the scattering operation. Alternatively, it may also be a coating of a material with increased thermal conductivity or a coating that makes enhanced adhesion of the abrasive grain on the abrasive material backing possible.

A further aspect of the invention relates to a collective of abrasive grains. A collective of abrasive grains is understood here and hereinafter as meaning a coherent collection of abrasive grains. For example, this may be a collection of abrasive grains that are contained in a container and are stored and/or transported as such, for example in a sack.

Such a collection of abrasive grains can be used to produce an abrasive article. The entirety of all the abrasive grains present in an abrasive article is also regarded as a collective of abrasive grains.

Preferably, the collective of abrasive grains includes at least 20% by weight, preferably at least 50% by weight, particularly preferably at least 90% by weight, of abrasive grains according to the invention, as described above. The other abrasive grains included in the collective may likewise have a defined form, but one that differs from the form according to the invention, or they may not have a defined form since they are for example fractured abrasive grains. These other abrasive grains included in the collective are also referred to as "supporting grains".

It is conceivable and within the scope of the invention that the abrasive grains according to the invention included in the collective are formed differently from one another. For example, the collective of abrasive grains may include a first fraction of abrasive grains of a first embodiment according to the invention and also a second fraction of abrasive grains of a second embodiment according to the invention that is different from the first embodiment according to the invention. In particular, the abrasive grains of the first embodiment according to the invention may differ from the abrasive grains of the second embodiment according to the invention in their size and/or in their form.

The collective of abrasive grains may consist exclusively of identical abrasive grains according to the invention; in particular, the collective then has a size distribution in the form of points.

The collective of abrasive grains may substantially have a size distribution that conforms to a size standard customary in the abrasives industry, for example the American National Standards Institute (ANSI), the Standards of the Federation of European Producers of Abrasives (FEPA) or the Japanese Industrial Standard (JIS). For example, the collective of the abrasive grains may substantially have a grain size of P12, P16, P20, P24, P30, P36, P40, P50, P60, P80, P100, P120, P150, P180, P220, P240, P280, P320, P360, P400, P500, P600, P800, P1000, P1200, P1500, P2000, P2500, P3000 or P5000 according to the FEPA standard. In this context, "substantially" have a size distribution means that at least 90% by weight, preferably at least 95% by weight, more preferably at least 99% by weight and particularly preferably all of the abrasive grains in the collective of abrasive grains meet this standard.

As already described above, it is also conceivable that the collective includes at least two different fractions of abrasive grains according to the invention and/or at least one fraction of abrasive grains not according to the invention. Each of these fractions may itself have a size distribution that respectively conforms to one of the aforementioned size standards customary in the abrasives industry.

An abrasive grain according to the invention or a collective of abrasive grains according to the invention can for example be produced by the following method known from U.S. Pat. No. 5,201,916:

a. preparing or providing a dispersion, containing $\alpha$-alumina particles and/or particles that can be converted into $\alpha$-alumina, and also at least one volatile dispersion medium, preferably water;

b. introducing the dispersion into at least one depression in a casting mold;

c. optionally wiping an upper side of the casting mold in order to remove at least part of the dispersion that stands above the upper side of the casting mold;

d. removing part of the volatile components of the dispersion, so as to form at least one abrasive grain precursor;

e. removing the abrasive grain precursor from the casting mold;

f. optionally calcining the abrasive grain precursor;

g. sintering the abrasive grain precursor in order to obtain at least one abrasive grain.

Before and/or during the preparation of the dispersion in step a), the raw materials, in particular $\alpha$-alumina particles and/or particles that can be converted into $\alpha$-alumina, may be ground. This may be performed for example with the aid of a ball mill, in particular with the aid of a planetary ball mill.

The dispersion may contain at least one dispersant. Such a dispersant facilitates the formation of the dispersion and increases its stability, for example by forming around the individual grains layers that prevent clumping. The dispersant may be for example a polymer. Generally, the dispersant breaks down at the latest during the sintering in step g).

A casting tool may be used for producing the abrasive grains according to the invention, the casting tool comprising at least one casting mold, which has at least one depression with a respective surface, the surface being complementary to the form of at least part of the surface of the abrasive grain.

There are preferably a multiplicity of depressions in the casting mold, and so a multiplicity of bodies of abrasive grains can be cast by one casting operation.

In a further development of the method known from U.S. Pat. No. 5,201,916, for the production of some embodiments according to the invention the aforementioned casting mold may advantageously be only part of a multipart casting tool that additionally comprises at least one molding element, in particular a further casting mold or die element, with which, in addition to the surface molded in the first casting mold, at least part of the remaining surface of the abrasive grain can be molded. For example, die elements that are guided into the filled depressions in the first casting mold may be provided.

The die elements preferably do not close off the depressions in the casting mold completely, and so the volatile component of the dispersion can escape.

More complicated forms of bodies of abrasive grains can be formed in casting molds that can be assembled, in a way similar to in the injection-molding process. For this purpose, at least one casting mold has at least one filling opening, through which the dispersion can be introduced into the depressions.

The casting mold and/or the die element may for example contain or consist of silicone. The depressions may have an open top surface, through which the dispersion can be introduced. The depressions in the casting mold have in each case a surface of a form that is complementary to the form of at least part of the surface of the desired abrasive grain.

The precursor produced in step d) should preferably be mechanically stable enough to be further processible as bulk material in the subsequent steps. The optional calcining in step f) is advantageous, or even required, in particular whenever the dispersion contains a number of different raw materials and a phase transformation is required.

Another aspect of the invention relates to an abrasive article that contains a collective of abrasive grains as described above. In particular, it is thus possible for at least 20% by weight, preferably at least 50% by weight, particularly preferably at least 90% by weight, of all the abrasive grains of the abrasive article to be formed as abrasive grains according to the invention, as described above. The other abrasive grains may likewise have a defined form, but one which differs from the form according to the invention, or they may not have a defined form.

The abrasive article may be for example a coated abrasive article (coated abrasive), a nonwoven abrasive article, a bonded abrasive article (bonded abrasive) or an abrasive brush.

A coated abrasive article includes a backing, in particular a flexible backing, such as for example paper, vulcanized fiber, a film, a textile material, a foam or multilayer combinations thereof. The abrasive grains can be secured to the backing with the aid of a base binder ("make coat"). The make coat and the abrasive grains may be covered with a top binder ("size coat"). Optionally, it is also possible for there to be above the size coat mentioned a second top binder ("supersize coat").

All binders known per se, for example of synthetic resin, such as for instance a phenolic resin, an epoxide, a urea resin, a melamine resin or an unsaturated polyester resin, may be used as the make coat, size coat and supersize coat. The size coat and/or supersize coat may also contain further customary active ingredients and/or fillers.

The abrasive article may take different product forms, for example that of an abrasive disk or that of an abrasive belt.

The invention also comprises a method for producing an abrasive article according to the invention, as described above. The method includes a step in which a collective of abrasive grains is fixed on and/or in a substrate, in particular by means of a binder. The substrate may be for instance a backing, in particular a flexible backing, of a coated abrasive article, a nonwoven material of a nonwoven abrasive, a matrix of a bonded abrasive or bristles of an abrasive brush. In the case of a coated abrasive article, the make coat and/or the abrasive grains and/or the size coat and/or the supersize coat can be applied by a method known per se. For example, the abrasive grains can be applied electrostatically or mechanically (i.e. gravimetrically). On account of the form according to the invention of the abrasive grains, even with mechanical scattering, a large proportion of the abrasive grains are oriented on an abrasive material backing such that a multiplicity of edges face away from the backing. This makes it possible to dispense with more complex electrostatic scattering.

Furthermore, the invention is also directed to a method for grinding a surface with an abrasive article as described above. The surface may be in particular a painted surface. In the case of a painted surface, abrasive grains with sizes of 500 μm or less are particularly suitable.

The object is also achieved by an abrasive grain with a defined form, the abrasive grain having a body which is simply connected and has a surface with at least two faces, in particular at least five faces, preferably at least seven faces, one face being formed as a base area. According to the invention, the contour of the base area has at least one reflex angle.

In the present application, a simply connected body is understood as meaning a body in which every continuous path on the body can be reduced to a point. The body accordingly does not have any holes passing right through it.

A reflex angle is an angle that is greater than 180°.

Usually, the angle in the base area defines a corner at which edges meet. In the case of a reflex angle in the contour of the base area, there is generally an edge at which two faces include a reflex angle. While a convex body is understood as meaning a body without "indentations" and without holes, according to the invention the abrasive grain body is not convex, but has an "indentation".

The "indentation" has the consequence that elsewhere, for example at the periphery of the "indentation", a corner and/or an edge with an acute angle must occur between mutually converging faces and/or elsewhere there must be a convex curvature with smaller radii of curvature than would be the case without the "indentation".

These indirectly defined pointed corners, sharp edge or greatly curved faces contribute to the improved cutting force of an abrasive grain.

In an advantageous solution of the invention, the abrasive grain has the form of a cone or a frustocone or has at least a component body of this form. That the abrasive grain includes a component body should not be understood in the sense that the abrasive grain has been or is necessarily joined together from two or more initially separately produced component bodies. Instead, the abrasive grains according to the invention are preferably formed as one piece.

A cone is understood here generally as meaning a geometrical body that is bounded by a substantially planar base area and substantially straight generating lines, a generating line respectively extending from each point of the outer contour of the base area to a common point of the cone (the vertex of the cone) (and so all of the generating lines lie between the contour of the base area and the vertex of the cone), the vertex of the cone lying outside the plane defined by the base area. This definition is therefore not restricted to circular cones nor to cones with a polygonal base area nor to straight cones. The base area of the abrasive grain, in particular the base area of the cone, has at least one reflex angle.

In particular, the cone may be a pyramid in which the base area is a polygon. A pyramid is a polyhedron that consists of a number of substantially planar faces lying one against the other, of which one is a polygon, in the present case a concave polygon, and all the others are triangles. The triangles (side faces) form the lateral area.

For the purposes of the present invention, the form of a frustocone is produced by cutting off from the form of a cone a smaller cone. In particular, a smaller cone that is similar to the original cone may be cut off from a cone parallel to the base area. This definition is also equally not restricted to polygonal base areas. If the base area is a polygon, the frustocone is a frustopyramid. The scope of the present invention is intended also to include those bodies that are produced by a cut that is not parallel to the base area. The frustopyramid accordingly consists of a base area, a number of quadrangles lying one against the other and a likewise polygonal top area.

The scope of the present invention also includes abrasive grains with a body that is bounded by a number of substantially planar faces lying one against the other, of which one, a concave polygon, forms a base area, the side faces are triangles or quadrangles that form base edges with the base area and form side edges with one another, the side edges converging with one another but not necessarily having to be in line with a point as in the case of a conventional cone or a conventional frustocone, in particular a conventional pyramid or a conventional frustopyramid.

The bodies claimed here with a polygonal base area and with side faces tapering with increasing distance from the base area taper overall with increasing distance from the base area. They therefore have a center of gravity in the vicinity of the base area and, with mechanical scattering onto a backing, preferably fall on the base area.

The edges and corners facing away from the backing, and consequently the abrasive effect, can be defined by the choice of the specific body form. In the present case, the concave contour of the base area ensures that enough sharp edges face away from the backing.

The concave base area is formed in particular by a star-shaped base area of the cone or frustocone, in particular of the pyramid or the frustopyramid.

The sharp edges that extend from the points of the star point in different spatial directions. When there are a multiplicity of abrasive grains applied randomly to a backing, there are consequently a multiplicity of sharp abrasive edges distributed uniformly in all directions.

The abrasive material can consequently be used well for all grinding directions, without any particular preferential direction.

In an advantageous embodiment of the invention, the abrasive grain or a component body of the abrasive grain has the form of a cylinder, in particular a prism, or an antiprism.

A cylinder is understood here and hereinafter as meaning a solid that is bounded by two base areas and also a lateral area. The base areas are in this case preferably substantially planar and likewise preferably substantially parallel to one another. The lateral area is formed by an array of lines that are substantially parallel to one another. Therefore, in particular, the form of the base areas is not restricted to polygons or circles.

If the base area is a polygon, the abrasive grain or its component body has the form of a prism. A prism is bounded by precisely two congruent n-edged polygons and n parallelograms. The n-edged polygons may in particular be regular n-edged polygons. In the case of a straight prism, the parallelograms mentioned are rectangles, in particular squares. Such a prism exists for every natural number n greater than or equal to three. At a corner, one n-edged polygon and two parallelograms always meet.

An antiprism is bounded by precisely two congruent n-edged polygons and 2n triangles, in particular equilateral triangles. Such an antiprism exists for every natural number n greater than or equal to three. At a corner, one n-edged polygon and three triangles always meet.

The linearly distorted prisms and antiprisms are also the subject of the present application.

In a linearly distorted prism or antiprism, i.e. one that is compressed or extended along at least one axis, in particular an axis of symmetry, not all symmetries are maintained compared to the undistorted form. Since, however, the forms mentioned have a multitude of symmetries, the linearly distorted corresponding solid still has a number of symmetries.

According to the invention, the congruent n-edged polygons of which one forms the base area have a concave contour. In particular, the base area is formed by a star-shaped polygon.

Simple geometrical solids, such as prisms or antiprisms, with a concave polygon contour, can be reproducibly produced in a comparatively undemanding manner.

Solids of this kind usually have a multitude of symmetries, and so for the individual bodies a number of equivalent alignments are obtained on a backing. When scattering abrasive grains onto a backing, a sufficiently large number of pointed edges and/or corners and/or more greatly curved surfaces face in the grinding direction.

In an advantageous embodiment of the abrasive grain according to the invention, the contour of the base area comprises at least one segment of a circle, preferably at least two and particularly preferably precisely two segments of a circle, which are preferably arranged symmetrically in relation to one another. In particular, the base area corresponds to the sectional image of a double-T anchor. The abrasive grain preferably has a body that is theoretically made up of a prism of which the base area corresponds to the sectional image of a double-T anchor and a saddleback roof-shaped cap.

The form and the size of the abrasive grain can be determined for instance with the aid of a microscope. The abrasive grain according to the invention may have a size in the entire range of sizes that is also customary for conventional abrasive grains. Usually, abrasive grains with larger sizes lead to a greater removal of material from a worked surface than smaller abrasive grains. For example, the abrasive grain may have a size in the range from 100 µm to 2000 µm. This size can be determined experimentally with the aid of a microscope. It is understood as the diameter of an enveloping circle of the microscoped image of the abrasive grain, that is to say the smallest diameter of a circle that encloses the image.

The form described above of the abrasive grain is an idealization. However, the invention also comprises abrasive grains that deviate from this idealized form within the limits of production tolerances. Possible deviations from the idealized form may be due to one or more of the following causes:
  cavities or small bubbles on account of trapped air and/or other gases in a dispersion from which the abrasive grains are produced;
  missing corners and/or edges that are produced due to incomplete filling of a casting mold and/or during removal of a precursor of the abrasive grain from a casting mold;

sunken side faces and/or edges that are produced due to shrinkage during the removal of part of the volatile components of the dispersion; in particular, sunken faces that are produced from the upper free surface of the dispersion, which is not in contact with the casting mold;

instances of flaking that are caused by a drying and/or sintering process;

broken-off corners and/or edges that are produced by transporting and/or during further processing of the abrasive grains as bulk material.

The deviations from the idealization do not necessarily have to lead to disadvantageous properties of the abrasive grain. For example, broken-off corner and/or edges can also have the effect that further cutting edges in comparison with the idealization are produced, and may even positively influence the abrasive effect.

The invention also comprises in particular abrasive grains of which the form only coincides substantially with the idealized form. However, the abrasive grain preferably has an idealized formed as described above.

The abrasive grain may for example contain or consist of a ceramic material, in particular a polycrystalline ceramic material. The abrasive grain preferably contains aluminum oxide, particularly preferably $\alpha\text{-}Al_2O_3$.

Alternatively or in addition, the abrasive grain may also contain at least one further metal oxide, such as for instance sodium oxide, magnesium oxide, iron oxide, silicon oxide, calcium oxide, zirconium oxide, yttrium oxide, zinc oxide, cobalt oxide, nickel oxide, hafnium oxide, chromium oxide, praseodymium oxide, samarium oxide, ytterbium oxide, neodymium oxide, lanthanum oxide, gadolinium oxide, cerium oxide, dysprosium oxide, erbium oxide, lutetium oxide, titanium oxide, manganese oxide or any desired combinations thereof.

Many of these metal oxides originate from impurities in the starting raw materials, such as for example in aluminum oxide. With sufficiently small fractions in the abrasive grain, such impurities do not however have any adverse influence on the production and application of the abrasive grain. Some of the impurities mentioned may even have a positive effect on the abrasive grain.

Fractions of zirconium oxide or yttrium oxide may for example originate from grinding balls that can be used in a grinding step in the production of the abrasive grains. Fractions of iron oxide may originate from a grinding vessel that is used in such a grinding step.

Likewise alternatively or in addition, the abrasive grain may contain further hard materials, such as for example silicon carbide.

Furthermore, the abrasive grain may contain at least one breakdown product of a dispersant described in more detail below that was used in the production of the abrasive grains. In addition, the abrasive grain may comprise at least one nucleating agent or breakdown product thereof that was used in the production of the abrasive grains. The nucleating agent may be for example the magnesium oxide already mentioned above.

Moreover, the abrasive grain may also contain at least one of the further substances described in EP 615 816 A1.

The ingredients mentioned can be determined with the aid of chemical analysis methods known per se.

The abrasive grain may contain or consist of a structure having one or more different phases. A first phase may consist of aluminum oxide, particularly preferably of $\alpha\text{-}Al_2O_3$. A second phase may consist of one or more of the aforementioned further metal oxides and/or further hard substances.

The proportion of aluminum oxide, in particular of $\alpha\text{-}Al_2O_3$, in the abrasive grain may be for example at least 25% by weight, preferably at least 50% by weight, more preferably at least 70% by weight, particularly preferably at least 95% by weight.

The abrasive grain may have a coating which covers only part of the surface, in particular only one or more edges and/or only one of a number of flat regions of the surface. The coating may for instance be a ferromagnetic or paramagnetic coating. Such a partial coating of the surface with a ferromagnetic or paramagnetic material makes it possible to align the abrasive grain in a given direction in a magnetic field applied during the scattering operation. Alternatively, it may also be a coating of a material with increased thermal conductivity or a coating that makes enhanced adhesion of the abrasive grain on the abrasive material backing possible. In particular, the coating may only be present on the base area of the abrasive grain.

A further aspect of the invention relates to a collective of abrasive grains. A collective of abrasive grains is understood here and hereinafter as meaning a coherent collection of abrasive grains. For example, this may be a collection of abrasive grains that are contained in a container and are stored and/or transported as such, for example in a sack.

Such a collection of abrasive grains can be used to produce an abrasive article. The entirety of all the abrasive grains present in an abrasive article is also regarded as a collective of abrasive grains.

Preferably, the collective of abrasive grains includes at least 20% by weight, preferably at least 50% by weight, particularly preferably at least 90% by weight, of abrasive grains according to the invention, as described above. The other abrasive grains included in the collective may likewise have a defined form, but one that differs from the form according to the invention, or they may not have a defined form since they are for example fractured abrasive grains. These other abrasive grains included in the collective are also referred to as "supporting grains".

It is conceivable and within the scope of the invention that the abrasive grains according to the invention included in the collective are formed differently from one another. For example, the collective of abrasive grains may include a first fraction of abrasive grains of a first embodiment according to the invention and also a second fraction of abrasive grains of a second embodiment according to the invention that is different from the first embodiment according to the invention. In particular, the abrasive grains of the first embodiment according to the invention may differ from the abrasive grains of the second embodiment according to the invention in their size and/or in their form.

The collective of abrasive grains may consist exclusively of identical abrasive grains according to the invention; in particular, the collective then has a size distribution in the form of points.

The collective of abrasive grains may substantially have a size distribution that conforms to a size standard customary in the abrasives industry, for example the American National Standards Institute (ANSI), the Standards of the Federation of European Producers of Abrasives (FEPA) or the Japanese Industrial Standard (JIS). For example, the collective of the abrasive grains may substantially have a grain size of P12, P16, P20, P24, P30, P36, P40, P50, P60, P80, P100, P120, P150, P180, P220, P240, P280, P320, P360, P400, P500, P600, P800, P1000, P1200, P1500, P2000, P2500, P3000 or P5000 according to the FEPA standard. In this context, "substantially" have a size distribution means that at least 90% by weight, preferably at least 95% by weight, more preferably at least 99% by weight and particularly preferably all of the abrasive grains in the collective of abrasive grains meet this standard.

As already described above, it is also conceivable that the collective includes at least two different fractions of abrasive grains according to the invention and/or at least one fraction of abrasive grains not according to the invention. Each of these fractions may itself have a size distribution that respectively conforms to one of the aforementioned size standards customary in the abrasives industry.

An abrasive grain according to the invention or a collective of abrasive grains according to the invention can for example be produced by the following method known from U.S. Pat. No. 5,201,916:

a. preparing or providing a dispersion, containing α-alumina particles and/or particles that can be converted into α-alumina, and also at least one volatile dispersion medium, preferably water;
b. introducing the dispersion into at least one depression in a casting mold;
c. optionally wiping an upper side of the casting mold in order to remove at least part of the dispersion that stands above the upper side of the casting mold;
d. removing part of the volatile components of the dispersion, so as to form at least one abrasive grain precursor;
e. removing the abrasive grain precursor from the casting mold;
f. optionally calcining the abrasive grain precursor;
g. sintering the abrasive grain precursor in order to obtain at least one abrasive grain.

Before and/or during the preparation of the dispersion in step a), the raw materials, in particular α-alumina particles and/or particles that can be converted into α-alumina, may be ground. This may be performed for example with the aid of a ball mill, in particular with the aid of a planetary ball mill.

The dispersion may contain at least one dispersant. Such a dispersant facilitates the formation of the dispersion and increases its stability, for example by forming around the individual grains layers that prevent clumping. The dispersant may be for example a polymer. Generally, the dispersant breaks down at the latest during the sintering in step g).

A casting tool may be used for producing the abrasive grains according to the invention, the casting tool comprising at least one casting mold, which has at least one depression with a respective surface, the surface being complementary to the form of at least part of the surface of the abrasive grain.

The casting mold may for example contain or consist of silicone. The depressions may have an open top surface, through which the dispersion can be introduced. The depressions in the casting mold have in each case a surface of a form that is complementary to the form of at least part of the surface of the desired abrasive grain.

Preferably, the depressions are formed such that they have areas and edges that are complementary to the areas and edges facing away from the base area of the abrasive grain. When the dispersion is poured into the depressions in the casting mold, the base area can then be produced on the free surface of the casting mold and does not have to be molded separately.

Alternatively, the recesses may be formed such that at least one area is complementary to the base area of the abrasive grain body.

A die element or a further casting mold may then be necessary to mold in a defined manner the areas and edges of the abrasive grain body that are not molded in the recesses in the first casting mold. The abrasive grain may for example be molded in a two-part casting tool, in a way similar to in an injection-molding process. In this case, if necessary, a pressure can be exerted on the dispersion to be molded, in order for example to achieve filled molds and planar faces.

The precursor produced in step d) should preferably be mechanically stable enough to be further processible as bulk material in the subsequent steps. The optional calcining in step f) is advantageous, or even required, in particular whenever the dispersion contains a number of different raw materials and a phase transformation is required.

Another aspect of the invention relates to an abrasive article that contains a collective of abrasive grains as described above. In particular, it is thus possible for at least 20% by weight, preferably at least 50% by weight, particularly preferably at least 90% by weight, of all the abrasive grains of the abrasive article to be formed as abrasive grains according to the invention, as described above. The other abrasive grains may likewise have a defined form, but one which differs from the form according to the invention, or they may not have a defined form.

The abrasive article may be for example a coated abrasive article (coated abrasive), a nonwoven abrasive article, a bonded abrasive article (bonded abrasive) or an abrasive brush.

A coated abrasive article includes a backing, in particular a flexible backing, such as for example paper, vulcanized fiber, a film, a textile material, a foam or multilayer combinations thereof. The abrasive grains can be secured to the backing with the aid of a base binder ("make coat"). The make coat and the abrasive grains may be covered with a top binder ("size coat"). Optionally, it is also possible for there to be above the size coat mentioned a second top binder ("supersize coat").

All binders known per se, for example of synthetic resin, such as for instance a phenolic resin, an epoxide, a urea resin, a melamine resin or an unsaturated polyester resin, may be used as the make coat, size coat and supersize coat. The size coat and/or supersize coat may also contain further customary active ingredients and/or fillers.

The abrasive article may take different product forms, for example that of an abrasive disk or that of an abrasive belt.

The invention also comprises a method for producing an abrasive article according to the invention, as described above. The method includes a step in which a collective of abrasive grains is fixed on and/or in a substrate, in particular by means of a binder. The substrate may be for instance a backing, in particular a flexible backing, of a coated abrasive article, a nonwoven material of a nonwoven abrasive, a matrix of a bonded abrasive or bristles of an abrasive brush. In the case of a coated abrasive article, the make coat and/or the abrasive grains and/or the size coat and/or the supersize coat can be applied by a method known per se. For example, the abrasive grains can be applied electrostatically or mechanically (i.e. gravimetrically). On account of the form according to the invention of the abrasive grains, even with mechanical scattering, a large proportion of the abrasive grains are oriented such that there is the advantage described above. This makes it possible to dispense with more complex electrostatic scattering.

Furthermore, the invention is also directed to methods for grinding a surface with an abrasive article as described above. The surface may be in particular a painted surface. In the case of a painted surface, abrasive grains with sizes of 500 µm or less are particularly suitable.

The invention is explained in more detail below with the aid of a number of exemplary embodiments and drawings, in which:

FIGS. A1a and b show a first embodiment of an abrasive grain according to the invention in two views;

FIGS. A2a and b show a second embodiment of an abrasive grain according to the invention in two views;

FIG. A3 shows a third embodiment of an abrasive grain according to the invention;

FIG. A4 shows a fourth embodiment of an abrasive grain according to the invention.

FIGS. B1a and b show two views of a further embodiment of an abrasive grain according to the invention in the form of a pyramid with a seven-cornered base area;

FIGS. B2a and b show two views of a further embodiment of an abrasive grain according to the invention in the form of a frustopyramid with a non-convex base area.

FIG. C1a shows a further embodiment of an abrasive grain according to the invention in a perspective view;

FIG. C1b shows the embodiment of an abrasive grain according to the invention in a first side view;

FIG. C1c shows the embodiment of an abrasive grain according to the invention in a second side view;

FIG. C1d shows the embodiment of an abrasive grain according to the invention in a plan view.

FIG. D1a shows a further embodiment of an abrasive grain according to the invention in a perspective view;

FIG. D1b shows the embodiment of an abrasive grain according to the invention according to FIG. D1a in a plan view;

FIG. D2a shows a further embodiment of an abrasive grain according to the invention in a perspective view;

FIG. D2b shows the embodiment of an abrasive grain according to the invention according to FIG. D2a in a plan view of the base area;

FIG. D3a shows a further embodiment of an abrasive grain according to the invention in a perspective view;

FIG. D3b shows the embodiment of an abrasive grain according to the invention according to FIG. D3a in a plan view;

FIG. D3c shows the embodiment of an abrasive grain according to the invention according to FIG. D1a in a side view.

The abrasive grain 110 represented in a perspective view in FIG. A1a includes a planar, circular first face 120 with a first outer contour 121 and a square, that is to say polygonal, second face 125 with a second outer contour 126, parallel to the first face. Between the first face 120 and the second face 125 there is formed a curved lateral face 130. The lines drawn on the lateral face 130 indicate the curved shape of the lateral area 130; however, they do not represent actual edges of the abrasive grain 110. The abrasive grain 110 extends completely between the two planes that are defined by the first face 120 and the second face 125.

The first outer contour 121 has no corner, since the direction of the tangent to the points of the first outer contour 121 runs continuously. The absence of corners in the first outer contour 121 contributes to the secure anchorage of the abrasive grain 110 in a make coat. By contrast with the first outer contour 121, the second outer contour 126 has four corners 127. Both these corners 127 and the four edges 128 extending between them provide an abrasive effect.

The perpendicular projection of the second face 125 onto the first face 120 extends completely within the first face 120, as can also be seen well in FIG. A1b. As a result, the abrasive grain 110 is particularly stable with respect to the tilting forces occurring during grinding if it lies with the first face 120 on an abrasive material backing that is not represented here.

FIG. A1b shows a lateral sectional view through the sectional plane S represented in FIG. A1a. This sectional plane S extends perpendicularly to the first face 120 and the second face 125 and through the center points of these two faces 120, 125. The abrasive grain 110 tapers along the direction R, which runs from the first face 120 perpendicularly to the second face 125. As a result, particularly good anchorage in a make coat applied to a backing can be achieved. Moreover, even with the aid of mechanical scattering, the abrasive grain 110 can with great probability be placed with the first face 120 on the backing. In this orientation, the corners 127 and the edges 128 also face away from the backing, and can consequently cause an abrasive effect. The sectional line of the lateral area 130 with this sectional plane S extends in a straight line.

A further embodiment according to the invention is represented in FIGS. A2a and A2b. This abrasive grain 210 also has a planar circular first face 220 with a first outer contour 221 and a square second face 225 with a second outer contour 226, parallel to the first face. By contrast with the abrasive grain 110 according to FIGS. A1a and A1b, the sectional line of the lateral area 230 of the abrasive grain 210 with a sectional plane S is convex, as can be seen in FIG. A2b. This convexity has the effect of producing in the region of the first face 220 a kind of "standing foot", with which the abrasive grain 210 can be anchored particularly stably in a make coat.

The abrasive grain 310 shown in FIG. A3 has a planar first face 320 with a first outer contour 321, which though not circular, similarly has no corners. The opposite second face 325, extending parallel to the first face, has the form of an irregular pentagon with five corners 327 and five edges 328 extending in between. This abrasive grain 310 does not taper in the direction R running perpendicularly from the first face 320.

Finally, the abrasive grain 410 according to FIG. A4 also has a planar first face 420 with a first outer contour 421 and a second face 425 with a second outer contour 426, extending parallel to the first face. The second outer contour 426 has four edges 428, 428', 428". Of these edges, the edge 428 is straight; the edges 428' are convexly curved; the edge 428" is concavely curved. At the point where two edges 428, 428', 428" touch, a corner 427 is respectively formed; this is so because at these points the direction of the tangent to the second outer contour 426 runs discontinuously.

The abrasive grains according to the invention may be produced for example by a method described hereinafter: firstly, a dispersion of 200 g of α-$Al_2O_3$, 0.4 g of MgO, 90 g of water as a dispersion medium and 0.5 g of dispersant is prepared. The MgO functions here as a nucleating agent. The product Dolapix CE64, obtainable from Zschimmer & Schwarz, 56108 Lahnstein, Germany, may be used for example as the dispersant. The dispersion thus obtained is ground for 30 minutes at 200 revolutions per minute in a planetary ball mill, for example a planetary ball mill PM400, obtainable from Retsch GmbH, 42781 Haan, Germany. Subsequently, the ground dispersion is introduced into a silicone casting mold containing depressions in the form of the desired abrasive grains. After that, the volatile component, that is the water, is removed from the dispersion. This produces an abrasive grain precursor, which is removed from the casting mold. The first face of the abrasive grain can then be produced from the upper free surface of the dispersion, which is not in contact with the casting mold. In a final step, the precursor is sintered as bulk material at 1550° C. for 5 minutes. The dispersant is burnt out in the course of sintering.

An abrasive article according to the invention may for example be produced as follows: on a backing of vulcanized fiber with a thickness of 0.8 mm, a phenolic resin dispersion is applied in an amount of 120 g/m² as a make coat precursor. Subsequently, 600 g/m² of the abrasive grains according to the invention are applied by means of electrostatic scattering. After that, the make coat precursor is cured to give a make coat. On top of the make coat and the abrasive grains, a phenolic resin dispersion is applied in an amount of 800 g/m² as a size coat precursor, which is likewise cured.

The abrasive grain 110 shown in FIGS. B1a and B1b is formed as a pyramid with a planar base area 111 in the form of a regular heptagon. It is therefore a special cone, in the sense of the definition used here, with a convex polygonal base area. The outer contour 112 of the base area 113 includes seven corners 113 and seven edges 114, which respectively connect two of the corners 113 to one another. Each of the corners 113 of the outer contour 112 of the base area 111 is connected by way of a respective edge 116 to a vertex 115 of the pyramid, which likewise forms a corner of the abrasive grain 110. Altogether, the abrasive grain 110 therefore includes eight corners 113, 115 and fourteen edges 114, 116.

The ratio of the height h and the area diameter (not represented here) of the base area 111 may lie in the range from 0.8 to 1.4. As explained above, it is advantageous for mechanical scattering if the ratio mentioned tends to be small, since, with mechanical scattering, the abrasive grain is then preferably oriented with its base area on an abrasive material backing such that the vertex 115 faces away from this backing. In terms of advantageous chip-forming behavior, on the other hand, greater ratios tend to be expedient.

The abrasive grain 210 according to FIGS. B2a and B2b is formed as a frustopyramid with a base area 211. According to FIG. B2b, the base area 211 has altogether 20 corners 213, 213', which are connected to one another by 20 edges 214. Of the 20 corners, the twelve corners 213 have an internal angle of 90°, while the eight corners 213' have an internal angle of 270°. The base area 211 is therefore not a convex polygon. The top area 217 of the pyramid is similar to the base area 211; the two areas can therefore be transformed one into the other by a combination of displacement and homothety. The top area 217 consequently also includes corners 218, 218' and 20 edges 219. Between the base area 211 and the top area 217 there extend 20 further edges 216, which respectively connect a corner 213, 213' of the base area 211 to a corresponding corner 218, 218' of the top area 217. The high numbers of edges 216, 219 and of corners 218, 218' provide a high cutting effect.

The abrasive grains according to the invention may be produced for example by a method described hereinafter: firstly, a dispersion of 200 g of α-Al$_2$O$_3$, 0.4 g of MgO, 90 g of water as a dispersion medium and 0.5 g of dispersant is prepared. The MgO functions here as a nucleating agent. The product Dolapix CE64, obtainable from Zschimmer & Schwarz, 56108 Lahnstein, Germany, may be used for example as the dispersant. The dispersion thus obtained is ground for 30 minutes at 200 revolutions per minute in a planetary ball mill, for example a planetary ball mill PM400, obtainable from Retsch GmbH, 42781 Haan, Germany. Subsequently, the ground dispersion is introduced into a silicone casting mold containing depressions in the form of the desired abrasive grains. After that, the volatile component, that is the water, is removed from the dispersion. This produces an abrasive grain precursor, which is removed from the casting mold. In a final step, the precursor is sintered as bulk material at 1550° C. for 5 minutes. The dispersant is burnt out in the course of sintering.

An abrasive article according to the invention may for example be produced as follows: on a backing of vulcanized fiber with a thickness of 0.8 mm, a phenolic resin dispersion is applied in an amount of 120 g/m² as a make coat precursor. Subsequently, 600 g/m² of the abrasive grains according to the invention are applied by means of electrostatic scattering. After that, the make coat precursor is cured to give a make coat. On top of the make coat and the abrasive grains, a phenolic resin dispersion is applied in an amount of 800 g/m² as a size coat precursor, which is likewise cured.

FIG. C1a shows an embodiment of an abrasive grain 10 according to the invention in a perspective view. FIG. C1b shows the first embodiment of the abrasive grain 10 according to the invention in a first side view, FIG. C1c in a second side view. FIG. C1d shows the abrasive grain 10 in a plan view.

The abrasive grain 10 has three main surfaces 11, 11', 11" and three subsidiary surfaces 12, 12', 12". The subsidiary surface 12 is connected by way of a first edge 13 to a first main surface 11 and is connected by way of a second edge 13' to a second main surface 11', which does not form any edge in common with the first main surface 11.

The subsidiary surface 12 includes an obtuse angle (not explicitly represented in the figures) with a first main surface 11 in the region of the first edge 13 and an obtuse angle with a second main surface 11' in the region of the second edge 13'.

By analogy, the subsidiary surface 12' is connected by way of a first edge to the main surface 11' and is connected by way of a second edge to the main surface 11", and the subsidiary surface 12" is connected by way of a first edge to the main surface 11" and is connected by way of a second edge to the main surface 11.

The abrasive grain 10 has an abrasive grain body 14 of which the surface 15 has three planar main surfaces 11, 11' and 11" that lie on the faces of an imaginary convex polyhedron, here a tetrahedron, the likewise imaginary side edges of which are flatly truncated.

The abrasive grain body 14 is theoretically made up of component bodies, on the one hand the tetrahedron with truncated edges 15, on the other hand a base 16, which has the form of a prism of which the base area corresponds to that of the tetrahedron with the truncated edges 15.

It is of course also conceivable and within the scope of the invention that, by contrast with FIGS. C1a to C1d, the abrasive grain body only consists of a tetrahedron with truncated edges 15, but does not include a base.

With mechanical scattering onto a backing, the abrasive grain 10 preferably falls on the base 16, and so the edges 13, 13' and corners 17 face away from the backing.

The abrasive grains according to the invention may be produced for example by a method described hereinafter: firstly, a dispersion of 200 g of α-Al$_2$O$_3$, 0.4 g of MgO, 90 g of water as a dispersion medium and 0.5 g of dispersant is prepared. The MgO functions here as a nucleating agent. The product Dolapix CE64, obtainable from Zschimmer & Schwarz, 56108 Lahnstein, Germany, may be used for example as the dispersant. The dispersion thus obtained is ground for 30 minutes at 200 revolutions per minute in a planetary ball mill, for example a planetary ball mill PM400, obtainable from Retsch GmbH, 42781 Haan, Germany. Subsequently, the ground dispersion is introduced into a silicone casting mold containing depressions in the form of the desired abrasive grains. For some embodiments of the abrasive grain, an additional molding element as described above may be used, for example a further casting mold, with which, in addition to the surface molded in the first casting mold, at least part of the remaining surface of the abrasive grain can be molded. After that, the volatile component, that is the water, is removed from the dispersion. This produces an abrasive grain precursor, which is removed from the casting mold. In a final step, the precursor is sintered as bulk material at 1550° C. for 5 minutes. The dispersant is burnt out in the course of sintering.

An abrasive article according to the invention may for example be produced as follows: on a backing of vulcanized fiber with a thickness of 0.8 mm, a phenolic resin dispersion is applied in an amount of 120 g/m² as a make coat precursor. Subsequently, 600 g/m² of the abrasive grains according to the invention are applied by means of electrostatic scattering. After that, the make coat precursor is cured to give a make coat. On top of the make coat and the abrasive grains, a phenolic resin dispersion is applied in an amount of 800 g/m² as a size coat precursor, which is likewise cured.

FIG. D1a shows a perspective view of a first exemplary embodiment of an abrasive grain 10 according to the invention, FIG. D1b a plan view of the same exemplary embodiment.

The abrasive grain 10 has the form of a cone in the sense of the general definition used here and has a surface 11 with two faces 12, 12', one face 13 being formed as the base area 13. The contour 14 of the base area 13 has a reflex angle 15.

FIG. D2a shows a perspective view of a second exemplary embodiment of an abrasive grain 20 according to the invention, FIG. D2b a plan view of the same exemplary embodiment toward the base area 23.

The abrasive grain 20 has a surface 21 with seven faces, one face being formed as the base area 23. The contour 24 of the base area 23 has three reflex angles 25.

Conversely, the contour 24 also has three acute angles 28, which are in each case starting points for sharp cutting edges 27.

The basic form of the abrasive body 20 is a pyramid 29, the base area 30 of which is formed by a star-shaped polygon 31. On account of the concave contour of the base area 23, the faces 22 however include at the edges 27 angles that are smaller than in the case of a tetrahedron. This leads to an increased cutting force of the abrasive grain.

FIG. D1a shows a perspective view of a third exemplary embodiment of an abrasive grain 130 according to the invention. FIG. D3b shows a plan view and FIG. D3c shows a side view of the same exemplary embodiment.

The contour 134 of the base area 133 comprises two segments of a circle 141, which are arranged symmetrically in relation to one another. The base area 133 corresponds to the sectional image of a double-T anchor 142, which is known as the logo of the company Robert Bosch GmbH.

The base area 133 has a contour 134 with four reflex angles 135.

The abrasive grain 130 has a body that is theoretically made up of a cylinder 143 in the sense of the general definition used here, the base area of which corresponds to the sectional image of a double-T anchor 142, and a saddleback roof-shaped cap 144. In fact, this abrasive grain 130 is of course likewise formed as one piece and can also be produced as one piece—for example with the aid of a casting mold with depressions that are complementary to the abrasive grain 130.

The sectional image of the saddleback roof, an equilateral triangle, is known as the logo of the company sia Abrasives Industries AG.

The design of the abrasive grain 130 combines functionality and recognizability.

The abrasive grains according to the invention may be produced for example by a method described hereinafter: firstly, a dispersion of 200 g of α-$Al_2O_3$, 0.4 g of MgO, 90 g of water as a dispersion medium and 0.5 g of dispersant is prepared. The MgO functions here as a nucleating agent. The product Dolapix CE64, obtainable from Zschimmer & Schwarz, 56108 Lahnstein, Germany, may be used for example as the dispersant. The dispersion thus obtained is ground for 30 minutes at 200 revolutions per minute in a planetary ball mill, for example a planetary ball mill PM400, obtainable from Retsch GmbH, 42781 Haan, Germany. Subsequently, the ground dispersion is introduced into a silicone casting mold containing depressions in the form of the desired abrasive grains. After that, the volatile component, that is the water, is removed from the dispersion. This produces an abrasive grain precursor, which is removed from the casting mold. In a final step, the precursor is sintered as bulk material at 1550° C. for 5 minutes. The dispersant is burnt out in the course of sintering.

An abrasive article according to the invention may for example be produced as follows: on a backing of vulcanized fiber with a thickness of 0.8 mm, a phenolic resin dispersion is applied in an amount of 120 g/m² as a make coat precursor. Subsequently, 600 g/m² of the abrasive grains according to the invention are applied by means of electrostatic scattering. After that, the make coat precursor is cured to give a make coat. On top of the make coat and the abrasive grains, a phenolic resin dispersion is applied in an amount of 800 g/m² as a size coat precursor, which is likewise cured.

Concept 1. An abrasive grain (110; 210; 310; 410), having a surface with at least a first face (120; 220; 320; 420) with a first outer contour (121; 221; 321; 421) and at least a second face (125; 225; 325; 425) with a second outer contour (126; 226; 326; 426), characterized in that the first outer contour (121; 221; 321; 421) does not include a corner and the second outer contour (126; 226; 326; 426) includes at least one corner (127; 227; 327; 427).

Concept 2. The abrasive grain (110; 210; 310; 410) of concept 1, characterized in that the first face (120; 220; 320; 420) is substantially planar.

Concept 3. The abrasive grain (110; 210; 310; 410) as described in either of the preceding concepts, characterized in that the first face (120; 220; 320; 420) and the second face (125; 225; 325; 425) lie opposite one another and are arranged in relation to one another at an angle that is less than 30°, preferably less than 20°, more preferably less than 10°, and is particularly preferably 0°.

Concept 4. The abrasive grain (110; 210; 310; 410) as described in one of the preceding concepts, characterized in that the abrasive grain (110; 210; 310; 410) extends completely between the two planes that are defined by the first face (120; 220; 320; 420) and the second face (125; 225; 325; 425).

Concept 5. The abrasive grain (110; 210; 310) as described in one of the preceding concepts, characterized in that the second face (125; 225; 325) is formed by a polygon.

Concept 6. The abrasive grain (110; 210) as described in one of the preceding concepts, characterized in that the perpendicular projection of the second face (125; 225) onto the first face (120; 220) lies completely within the convex envelope of the first face (120; 220), in particular within the first face (120; 220).

Concept 7. The abrasive grain (110; 210) as described in concept 6, characterized in that the abrasive grain (110; 210) tapers along a direction (R) running perpendicularly from the first face (120; 220).

Concept 8. The abrasive grain (210) as described in one of the preceding concepts, characterized in that between the first face (220) and the second face (225), a lateral area (230) is formed, the lines of intersection of the lateral area (230) with at least one sectional plane (S) that extends perpendicularly to the first face (220) and perpendicularly to the second face (225), in particular with each such sectional plane (5), being at least partially, preferably completely, concave, in particular strictly concave.

Concept 9. The abrasive grain (110; 210; 310; 410) as described in one of the preceding concepts, characterized in that it contains or consists of a ceramic material, in particular a polycrystalline ceramic material, preferably aluminum oxide, particularly preferably $\alpha$-$Al_2O_3$.

Concept 10. A collective of abrasive grains (110; 210; 310; 410), characterized in that it includes at least 20% by weight, preferably at least 50% by weight, particularly preferably at least 90% by weight, of abrasive grains (110; 210; 310; 410) as described in one of the preceding concepts.

Concept 11. A method for producing at least one abrasive grain (110; 210; 310; 410) or a collective of abrasive grains (110; 210; 310; 410) as described in one of the preceding concepts, characterized by the following steps: (a.) preparing or providing a dispersion, containing $\alpha$-alumina particles and/or particles that can be converted into $\alpha$-alumina, and also at least one volatile dispersion medium, preferably water; (b.) introducing the dispersion into at least one depression in a casting mold; (c.) optionally wiping an upper side of the casting mold in order to remove at least part of the dispersion that stands above the upper side of the casting mold; (d.) removing part of the volatile components of the dispersion, so as to form at least one abrasive grain precursor; (e.) removing the abrasive grain precursor from the casting mold; (f.) optionally calcining the abrasive grain precursor; (g.) sintering the abrasive grain precursor in order to obtain at least one abrasive grain (110; 210; 310; 410).

Concept 12. A casting tool for producing at least one abrasive grain (110; 210; 310; 410) as described in one of concepts 1 to 9, the casting tool comprising at least one casting mold, which has at least one depression, preferably a multiplicity of depressions, with a respective surface, the surface being complementary to the form of at least part of the surface of the abrasive grain (110; 210; 310; 410).

Concept 13. An abrasive article, containing a collective of abrasive grains (110; 210; 310; 410) as described in concept 10.

Concept 14. A method for producing an abrasive article as described in concept 13, including a step in which a collective of abrasive grains (110; 210; 310; 410) as described in concept 10 is fixed on and/or in a substrate, in particular by means of a binder.

Concept 15. A method for grinding a surface, in particular a painted surface, with a grinding article as described in concept 13.

Concept 16. An abrasive grain (110; 210) with a surface that includes at least one main face (111; 211) with an outer contour (112; 212) that has at least seven corners (113; 213; 213').

Concept 17. The abrasive grain (110) as described in concept 16, characterized in that the abrasive grain (110) is formed as a cone, in particular as a pyramid, with a base area (111) of which the outer contour (112) has at least seven corners (113).

Concept 18. The abrasive grain (210) as described in concept 16, characterized in that the abrasive grain (210) is formed as a frustocone, in particular as a frustopyramid, with a base area (211) of which the outer contour (212) has at least seven corners (213; 213').

Concept 19. The abrasive grain (110; 210) as described in one of the preceding concepts, characterized in that the ratio of the height (h) of the abrasive grain (110; 210) and the area diameter of the main face (111; 211) lies in the range from 0.8 to 1.4, preferably from 0.9 to 1.2, particularly preferably from 0.95 to 1.05.

Concept 20. The abrasive grain (110; 210) as described in one of the preceding concepts, characterized in that the base area (111; 211) is a polygon with at least seven corners.

Concept 21. The abrasive grain (110) as described in concept 20, characterized in that the polygon is convex.

Concept 22. The abrasive grain (110) as described in concept 21, characterized in that the polygon is regular.

Concept 23. The abrasive grain (110; 210) as described in one of the preceding concepts, characterized in that the main face (111; 211) is substantially planar.

Concept 24. The abrasive grain (110; 210) as described in one of the preceding concepts, characterized in that it contains or consists of a ceramic material, in particular a polycrystalline ceramic material, preferably aluminum oxide, particularly preferably $\alpha$-$Al_2O_3$.

Concept 25. A collective of abrasive grains (110; 210), characterized in that it includes at least 20% by weight, preferably at least 50% by weight, particularly preferably at least 90% by weight, of abrasive grains (110; 210) as described in one of the preceding concepts.

Concept 26. A method for producing at least one abrasive grain (110; 210) or a collective of abrasive grains (110; 210) as described in one of the preceding concepts, characterized by the following steps: (a.) preparing or providing a dispersion, containing $\alpha$-alumina particles and/or particles that can be converted into $\alpha$-alumina, and also at least one volatile dispersion medium, preferably water; (b.) introducing the dispersion into at least one depression in a casting mold; (c.) optionally wiping an upper side of the casting mold in order to remove at least part of the dispersion that stands above the upper side of the casting mold; (d.) removing part of the volatile components of the dispersion, so as to form at least one abrasive grain precursor; (e.) removing the abrasive grain precursor from the casting mold; (f.) optionally calcining the abrasive grain precursor; (g.) sintering the abrasive grain precursor in order to obtain at least one abrasive grain (110; 210).

Concept 27. A casting mold for producing at least one abrasive grain (110; 210) as described in one of concepts 16-24, the casting mold having at least one depression, preferably a multiplicity of depressions, with a respective surface, the surface being complementary to the form of at least part of the surface of the abrasive grain (110; 210).

Concept 28. An abrasive article, containing a collective of abrasive grains (110; 210) as described in concept 25.

Concept 29. A method for producing an abrasive article as described in concept 26, including a step in which a collective of abrasive grains (110; 210) as described in concept 25 is fixed on and/or in a substrate, in particular by means of a binder.

Concept 30. A method for grinding a surface, in particular a painted surface, with an abrasive article as described in concept 28.

Concept 31. An abrasive grain (10) with at least two main surfaces (11, 11', 11") and at least one subsidiary surface (12, 12', 12"), which is connected by way of a first edge (13) to a first main surface (11) and is connected by way of a second edge (13') to a second main surface (11'), which does not have any edge in common with the first main surface (11), characterized in that the subsidiary surface (12) includes an obtuse angle with a first main surface (11) in the region of the first edge (13) and an obtuse angle with a second main surface (11') in the region of the second edge (13').

Concept 32. An abrasive grain (10) with a defined form, in particular an abrasive grain (10) as described in concept 31, characterized in that the abrasive grain (10) has an abrasive grain body (14) of which the surface (15) has at least two substantially planar main surfaces (11, 11', 11") that lie on the faces of an imaginary convex polyhedron, in particular a Platonic solid, an Archimedean solid, a Catalan solid, a prism or antiprism, on the faces of a linearly distorted Platonic solid, Archimedean solid, Catalan solid, prism or antiprism or on the faces of an imaginary combination of the solids mentioned, the abrasive grain body having at least one flatly truncated edge.

Concept 33. The abrasive grain (10) as described in concept 31 or 32, characterized in that some of the faces (11, 11', 11") of the abrasive grain (10), in particular main surfaces, lie on the faces of an imaginary pyramid or an imaginary frustpyramid, in particular on the faces of a tetrahedron.

Concept 34. The abrasive grain (10) as described in one of the preceding concepts, characterized in that each main surface (11, 11'; 11") is connected to at least one other main surface (11, 11', 11') by way of a subsidiary surface (12, 12', 12").

Concept 35. The abrasive grain (10) as described in one of the preceding concepts, characterized in that it contains or consists of a ceramic material, in particular a polycrystalline ceramic material, preferably aluminum oxide, particularly preferably α-Al$_2$O$_3$.

Concept 36. A collective of abrasive grains (10), characterized in that it includes at least 20% by weight, preferably at least 50% by weight, particularly preferably at least 90% by weight, of abrasive grains (10) as described in one of the preceding concepts.

Concept 37. A method for producing at least one abrasive grain (10) or a collective of abrasive grains (10) as described in one of the preceding concepts, characterized by the following steps: (a.) preparing or providing a dispersion, containing α-alumina particles and/or particles that can be converted into α-alumina, and also at least one volatile dispersion medium, preferably water; (b.) introducing the dispersion into at least one depression in a casting mold; (c.) optionally wiping an upper side of the casting mold in order to remove at least part of the dispersion that stands above the upper side of the casting mold; (d.) removing part of the volatile components of the dispersion, so as to form at least one abrasive grain precursor; (e.) removing the abrasive grain precursor from the casting mold; (f.) optionally calcining the abrasive grain precursor; (g.) sintering the abrasive grain precursor in order to obtain at least one abrasive grain (10).

Concept 38. A casting mold for producing at least one abrasive grain (10) as described in one of concepts 31 to 35, the casting mold having at least one depression, preferably a multiplicity of depressions, with a respective surface, the surface being complementary to the form of at least part of the surface of the abrasive grain (10).

Concept 39. An abrasive article, containing a collective of abrasive grains (10) as described in concept 36.

Concept 40. A method for producing an abrasive article as described in concept 39, including a step in which a collective of abrasive grains (10) as described in concept 36 is fixed on and/or in a substrate, in particular by means of a binder.

Concept 41. A method for grinding a surface, in particular a painted surface, with an abrasive article as described in concept 39.

Concept 42. An abrasive grain (10; 20; 130) with a defined form, the abrasive grain (10; 20; 130) having a body which is simply connected and has a surface (11; 21) with at least two faces, in particular at least five faces (12, 12'; 22, 22'), preferably at least seven faces, one face being formed as a base area (13; 23; 133), characterized in that the contour (14; 24; 134) of the base area (13; 23; 133) has at least one reflex angle (14; 25; 135).

Concept 43. The abrasive grain (10; 20) as described in concept 42, characterized in that the abrasive grain (10; 20) or a component body of the abrasive grain (10; 20) has the form of a cone (10; 29), in particular of a pyramid (29), or a frustocone, in particular a frustopyramid, the base area (23) being formed in particular by a star-shaped base area (13; 30) of the cone (10; 29), in particular of the pyramid (29), or the frustocone, in particular the frustopyramid.

Concept 44. The abrasive grain (130) as described in concept 42 or 43, characterized in that the abrasive grain (130) or a component body of the abrasive grain (130) has the form of a cylinder (143), in particular of a prism, or of an antiprism, the base area (23) being formed in particular by a star-shaped polygon.

Concept 45. The abrasive grain (130) as described in concept 42 or 44, characterized in that the contour (134) of the base area (133) comprises at least one segment of a circle, preferably at least two and particularly preferably precisely two segments of a circle (141), and in particular corresponds to the sectional image of a double-T anchor (142).

Concept 46. The abrasive grain (10; 20; 130) as described in one of the preceding concepts, characterized in that it contains or consists of a ceramic material, in particular a polycrystalline ceramic material, preferably aluminum oxide, particularly preferably α-Al$_2$O$_3$.

Concept 47. A collective of abrasive grains (10; 20; 130), characterized in that it includes at least 20% by weight, preferably at least 50% by weight, particularly preferably at least 90% by weight, of abrasive grains (10; 20; 130) as described in one of the preceding concepts.

Concept 48. A method for producing at least one abrasive grain (10; 20; 130) or a collective of abrasive grains (10; 20; 130) as described in one of the preceding concepts, characterized by the following steps: (a.) preparing or providing a dispersion, containing α-alumina particles and/or particles that can be converted into α-alumina, and also at least one volatile dispersion medium, preferably water; (b.) introducing the dispersion into at least one depression in a casting mold; (c.) optionally wiping an upper side of the casting mold in order to remove at least part of the dispersion that stands above the upper side of the casting mold; (d.) removing part of the volatile components of the dispersion, so as to form at least one abrasive grain precursor; (e.) removing the abrasive grain precursor from the casting mold; (f.) optionally calcining the abrasive grain precursor; (g.) sintering the abrasive grain precursor in order to obtain at least one abrasive grain (10; 20; 130).

Concept 49. A casting tool for producing at least one abrasive grain (10; 20; 130) as described in one of concepts 42 to 46, the casting tool comprising at least one casting mold, which has at least one depression, preferably a multiplicity of depressions, with a respective surface, the surface being complementary to the form of at least part of the surface of the abrasive grain (10; 20; 130).

Concept 50. An abrasive article, containing a collective of abrasive grains (10; 20; 130) as described in concept 47.

Concept 51. A method for producing an abrasive article as described in concept 50, including a step in which a collective of abrasive grains (10; 20; 130) as described in concept 47 is fixed on and/or in a substrate, in particular by means of a binder.

Concept 52. A method for grinding a surface, in particular a painted surface, with a grinding article as described in concept 50.

The invention claimed is:
1. An abrasive grain, comprising:
a surface with at least a first face with a first outer contour and at least a second face with a second outer contour,
wherein the first outer contour does not include a corner, and
wherein the second outer contour includes at least one corner.
2. The abrasive grain as claimed in claim 1, wherein the first face is substantially planar.
3. The abrasive grain as claimed in claim 1, wherein the first face and the second face lie opposite one another and are arranged in relation to one another at an angle that is less than 30°.
4. The abrasive grain as claimed in claim 1, wherein:
the first face defines a first plane,
the second face defines a second plane, and
the abrasive grain extends completely between the first plane and the second plane.
5. The abrasive grain as claimed in claim 1, wherein the second face is formed by a polygon.
6. The abrasive grain as claimed in claim 1, wherein a perpendicular projection of the second face onto the first face lies completely within a convex envelope of the first face.
7. The abrasive grain as claimed in claim 6, wherein the abrasive grain tapers along a direction running perpendicularly from the first face.
8. The abrasive grain as claimed in claim 1, wherein:
between the first face and the second face, a lateral area is formed, and
lines of intersection of the lateral area with at least one sectional plane that extends perpendicularly to the first face and perpendicularly to the second face being at least partially concave.
9. The abrasive grain as claimed in claim 1, wherein the abrasive grain is included in a collective of abrasive grains of which at least 20% by weight are identical to the abrasive grain.
10. The abrasive grain as claimed in claim 1, wherein a casting tool for producing at least one abrasive grain includes at least one casting mold, which has at least one depression with a respective surface, the surface being complementary to a form of at least part of the surface.
11. The abrasive grain as claimed in claim 1, wherein the abrasive grain is included in an abrasive article containing a collective of the abrasive grains.
12. An abrasive grain, comprising:
a surface with at least a first face with a first outer contour and at least a second face with a second outer contour, wherein:
the first outer contour does not include a corner,
the second outer contour includes at least one corner,
a lateral area is formed between the first face and the second face, and
lines of intersection of the lateral area with at least one sectional plane that extends perpendicularly to the first face and perpendicularly to the second face are at least partially concave.

* * * * *